(12) United States Patent
Yasunaga et al.

(10) Patent No.: US 10,670,917 B2
(45) Date of Patent: Jun. 2, 2020

(54) LIGHTING DEVICE AND DISPLAY DEVICE

(71) Applicant: Sharp Kabushiki Kaisha, Sakai, Osaka (JP)

(72) Inventors: Hirotoshi Yasunaga, Sakai (JP); Mitsuhiro Murata, Sakai (JP); Hisashi Watanabe, Sakai (JP); Ryuzo Yuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 73 days.

(21) Appl. No.: 15/765,495

(22) PCT Filed: Sep. 28, 2016

(86) PCT No.: PCT/JP2016/078564
§ 371 (c)(1),
(2) Date: Apr. 3, 2018

(87) PCT Pub. No.: WO2017/061312
PCT Pub. Date: Apr. 13, 2017

(65) Prior Publication Data
US 2019/0072822 A1    Mar. 7, 2019

(30) Foreign Application Priority Data
Oct. 5, 2015 (JP) .................................. 2015-197452

(51) Int. Cl.
*G02F 1/13357* (2006.01)
*F21V 8/00* (2006.01)
*G02F 1/1335* (2006.01)

(52) U.S. Cl.
CPC ...... *G02F 1/133611* (2013.01); *G02B 6/0011* (2013.01); *G02F 1/133524* (2013.01);
(Continued)

(58) Field of Classification Search
CPC .................. G02B 6/0088; G02F 2001/133322
See application file for complete search history.

(56) References Cited

U.S. PATENT DOCUMENTS

2003/0189831 A1* 10/2003 Yoneda ..................... F21K 9/00
362/294
2006/0291183 A1* 12/2006 Nishiyama ........... G02B 6/0018
362/23.15
(Continued)

FOREIGN PATENT DOCUMENTS

JP        2003-167241 A    6/2003
JP        2008-96809 A     4/2008
(Continued)

OTHER PUBLICATIONS

Official Communication issued in International Patent Application No. PCT/JP2016/078564, dated Nov. 8, 2016.

*Primary Examiner* — Andrew J Coughlin
(74) *Attorney, Agent, or Firm* — Keating & Bennett, LLP

(57) ABSTRACT

A lighting device includes LEDs, a light guide plate, and a frame. The light guide plate includes a light guide plate hole portion passing through in a thickness direction, a light entering surface, and a light exiting surface. The frame surrounds the light guide plate. The frame includes an outer peripheral wall portion and an inner peripheral wall portion. The outer peripheral wall portion opposes an outer peripheral end face of the light guide plate. The inner peripheral wall portion inserted to the light guide plate hole portion opposes an inner peripheral end face of the light guide plate on an inner side of the light guide plate hole portion. The inner peripheral wall portion has a configuration in which the opposing surface has a lower light reflectivity than that of an opposing surface of the outer peripheral wall portion.

19 Claims, 16 Drawing Sheets

(52) U.S. Cl.
CPC .. *G02F 1/133603* (2013.01); *G02F 1/133605* (2013.01); *G02F 1/133608* (2013.01); *G02F 1/133615* (2013.01); *G02F 2201/56* (2013.01)

(56) References Cited

U.S. PATENT DOCUMENTS

| | | | |
|---|---|---|---|
| 2008/0129916 A1 | 6/2008 | Ota et al. | |
| 2010/0103341 A1* | 4/2010 | Ota | G07F 17/3202 349/58 |
| 2013/0063957 A1* | 3/2013 | Sakai | F21V 3/00 362/363 |
| 2014/0028951 A1 | 1/2014 | Watanabe | |
| 2014/0029292 A1 | 1/2014 | Mizushiro et al. | |
| 2014/0293141 A1 | 10/2014 | Tsubokura et al. | |
| 2016/0161664 A1* | 6/2016 | Ishida | G02B 6/0045 359/230 |
| 2017/0075162 A1 | 3/2017 | Tsubokura et al. | |

FOREIGN PATENT DOCUMENTS

| | | | |
|---|---|---|---|
| JP | 2008-249531 A | | 10/2008 |
| JP | 2009-128519 A | | 6/2009 |
| JP | 2013-125606 A | | 6/2013 |
| JP | 2014-26173 A | | 2/2014 |
| JP | 2014-41813 A | | 3/2014 |
| JP | 2014-191114 A | | 10/2014 |
| WO | WO2015022887 | * | 2/2015 |

* cited by examiner

LIGHTING DEVICE AND DISPLAY DEVICE

TECHNICAL FIELD

The present invention relates to a lighting device and a display device.

BACKGROUND ART

A liquid crystal panel is being widely used for a display section of a display device. The liquid crystal panel cannot emit light by itself, and thus uses light of a lighting device (so-called, backlight device) to display an image. This type of lighting device is arranged on a rear surface side of the liquid crystal panel and is configured to irradiate the rear surface of the liquid crystal panel with light spread to a planar form.

A lighting device including a light guide plate, and an LED (Light Emitting Diode) light source arranged to oppose an end face of the light guide plate is known for the lighting device. This type of lighting device is generally referred to as an edge light type (or side light type) and is known to be a device suited for thinning, power saving, and the like.

In the edge light type lighting device, the end face of the light guide plate becomes a light entering surface, to which light from the LED light source enters, and a plate surface on a front side of the light guide plate becomes a light exiting surface, through which light entering through the light entering surface exits toward the liquid crystal panel. The light guided from the light entering surface into the light guide plate is propagated through the light guide plate while repeating reflection and the like, and exits through the light exiting surface.

In recent years, a display device having a wide variety of shapes is being demanded due to diversification in design and application of the display device. For example, Patent Document 1 illustrates a configuration in which an electronic equipment including the display device is applied to a meter unit arranged on an instrumental panel of an automobile. The display device has a through-hole formed in the lighting device (light guide plate thereof) and includes a cap inserted to the through hole. The document describes that the cap is preferably formed with a non-light transmissive resin to suppress light leakage.

PRIOR ART DOCUMENT

Patent Document

Patent Document 1: Japanese Patent Application Laid-Open No. 2014-191114

Problem to be Solved by the Invention

The resin of low light transmittance generally tends to have higher light reflectivity. Thus, the lighting device disclosed in Patent Document 1 has a problem in that the light reflected by the cap exits through the light exiting surface of the light guide plate at the periphery of the through hole, thus causing uneven brightness.

In order to suppress the uneven brightness, a configuration of uniformly reducing the light reflectivity of a member surrounding the end face of the light guide plate to reduce the reflection of light leaking out from the end face of the light guide plate can be considered. With such configuration, however, the brightness of the lighting device is reduced.

DISCLOSURE OF THE PRESENT INVENTION

The present invention has been completed based on the situations described above, and aims to reduce uneven brightness while suppressing reduction in brightness in a configuration equipped with a light guide plate including a hole portion.

Means for Solving the Problem

A lighting device of the present invention may include a light source; a light guide plate configured by a plate shaped member including a hole portion passing through in a thickness direction, the light guide plate including a light entering surface which is constituted of an outer peripheral end face of the plate shaped member and to which light from the light source enters, and a light exiting surface which is constituted of one plate surface of the plate shaped member and through which light entering through the light entering surface exits; and a frame surrounding the light guide plate, the frame including an outer peripheral wall portion opposing the outer peripheral end face of the light guide plate, and an inner peripheral wall portion inserted to the hole portion and opposing an inner peripheral end face of the light guide plate on an inner side of the hole portion and in which a surface opposing the inner peripheral end face has a lower light reflectivity than that of a surface opposing the outer peripheral end face of the outer peripheral wall portion.

According to the present invention, the light reflectivity of the surface opposing the inner peripheral end face of the inner peripheral wall portion (hereinafter referred to as opposing surface of the inner peripheral wall portion) is low compared to that of the surface opposing the outer peripheral end face of the outer peripheral wall portion (hereinafter referred to as opposing surface of the outer peripheral wall portion), and thus an event in which the light leaking out from the inner peripheral end face of the light guide plate is reflected at the opposing surface of the inner peripheral wall portion and exits from the hole edge of the hole portion can be suppressed compared to when the light reflectivity is the same. The light leaking out from the outer peripheral end face of the light guide plate can again enter the light guide plate efficiently by configuring the opposing surface of the outer peripheral wall portion so as to have a higher light reflectivity than that of the opposing surface of the inner peripheral wall portion. As a result, the region where the brightness is locally high can be suppressed from being formed at the periphery of the hole portion while suppressing the reduction in the brightness in the lighting device.

In the lighting device, the inner peripheral wall portion may have a surface opposing the inner peripheral end face and being black. According to such configuration, the light reflectivity of the opposing surface of the inner peripheral wall portion can be suitably reduced.

In the lighting device, the outer peripheral wall portion may have a surface opposing the outer peripheral end face of the outer peripheral wall portion and being white. According to such configuration, the light reflectivity of the opposing surface can be set high and the reduction in brightness can be suitably suppressed at the outer peripheral wall portion where the problem of uneven brightness is less likely to occur compared to the inner peripheral wall portion.

The lighting device may further include a light blocking member arranged to cover a hole edge of the hole portion in the light guide plate from the light exiting surface side and provided to block light exiting from the hole edge of the hole portion. According to such configuration, the region where the brightness is locally high can be more suppressed from being formed at the periphery of the hole portion.

In the lighting device, the light blocking member may be configured by an adhesive layer in which a surface on the light guide plate side is black. According to such configuration, the brightness of the end face of the light blocking member can be suppressed from becoming locally high by the light guided by the adhesive layer.

In the lighting device, the light guide plate may have a substantially toric shape in a plan view. In such configuration, a configuration in which the light source and the inner peripheral wall portion are arranged opposing each other is easily obtained, and in particular, the region on the light source side at the periphery of the hole portion easily becomes the region where the brightness is locally high. By configuring the inner peripheral wall portion in the above manner, however, the region where the brightness is locally high can be suitably suppressed from being formed.

In the lighting device, the inner peripheral end face of the light guide plate may be provided with a light reflecting portion configured to reflect light advancing outward from the inside of the light guide plate toward the interior of the light guide plate. According to such configuration, the amount of light leaking out into the hole portion and reflected at the internal wall portion can be reduced, and the region where the brightness is locally high can be suitably suppressed from being formed at the periphery of the hole portion.

In the lighting device, a pair of the light sources may be arranged at positions sandwiching the hole portion of the light guide plate. According to such configuration, in the lighting device including the hole portion, of the pair of light sources, light from one light source can be supplied to a region on the opposite side of the hole portion with respect to the other light source, and with the inner peripheral wall portion as a shielding object, the brightness of the region on the opposite side of the light source with respect to the hole portion can be suppressed from being locally reduced.

Furthermore, a display device according to the present invention may include the lighting device; and a display panel including a display area that is arranged on a light exiting side of the lighting device and that carries out display using light from the lighting device, and a non-display area that is arranged in the display area and corresponds to a position of the hole portion and where image is not displayed. Thus, the lighting device can be applied to a display device equipped with a display panel in which a non-display area is arranged in a display area.

In the display device, the light blocking member may be a double-sided adhesive tape laminating the lighting device and the display panel. According to such configuration, an existing double-sided adhesive tape can be given the function of the light blocking member, and thus is suitable.

Advantageous Effect of the Invention

According to the present invention, the uneven brightness can be reduced while suppressing the reduction in the brightness in a configuration equipped with the light guide plate including the hole portion.

BEST MODE FOR CARRYING OUT THE INVENTION

First Embodiment

A first embodiment of the present invention will be described with reference to FIGS. 1 to 4. In the present embodiment, a liquid crystal display device (display device) 10 equipped with an edge light type lighting device 20 is illustrated. In each figure, X axis, Y axis, and Z axis are shown. Furthermore, description will be made with an upper side in FIG. 2 as a front side (display surface side) of the liquid crystal display device 10 and a lower side as a back side (rear surface side).

The liquid crystal display device 10 configures one part of an instrumental panel of an automobile, and displays various types of images such as an image of meters and gauges, a map image of a car navigation system, a photographed image by an in-vehicle camera. The application of the liquid crystal display device is not limited thereto, and the liquid crystal display device can be suitably used, for example, in a wearable electronic equipment such as a watch.

Figure 1:
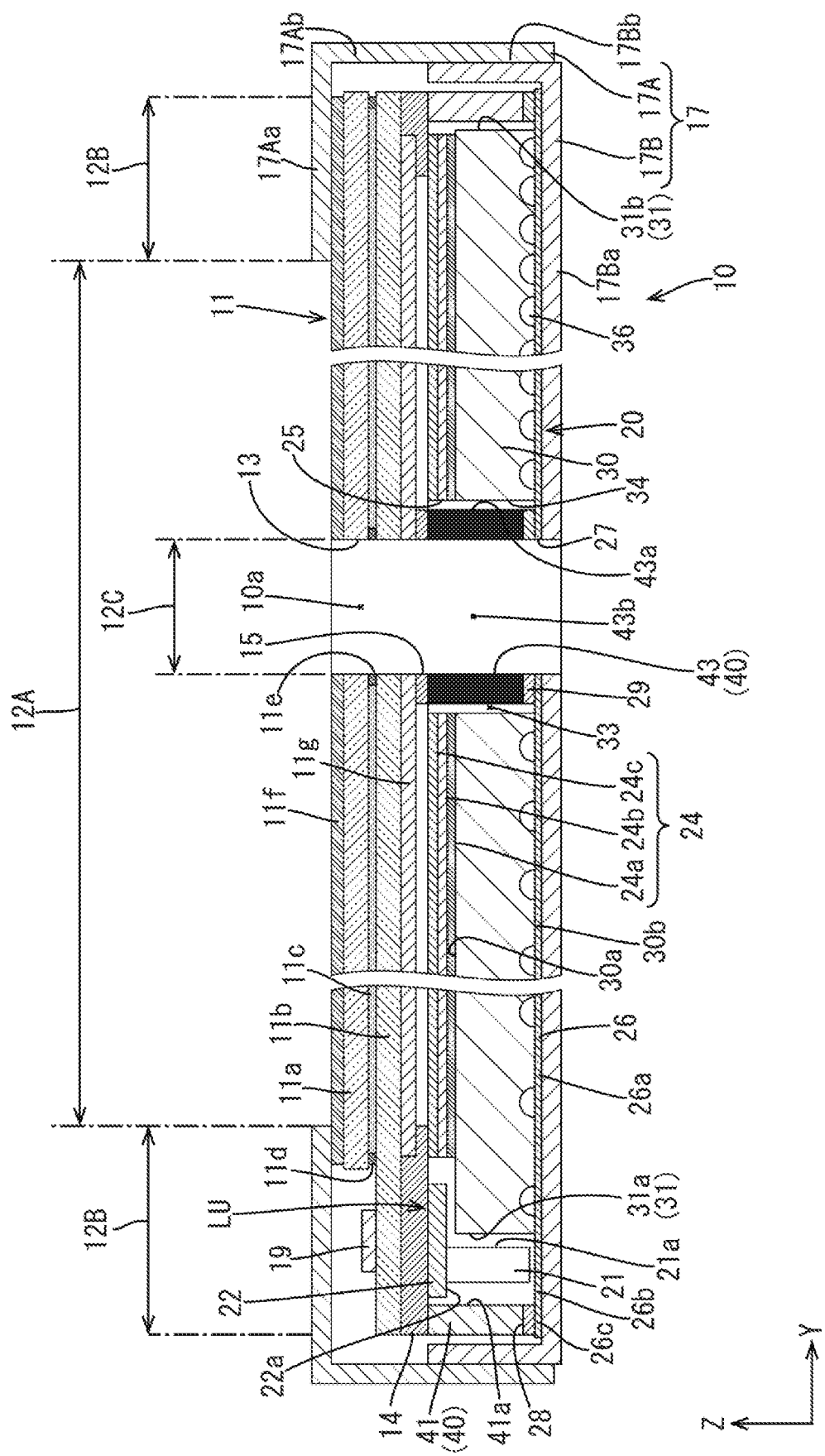
FIG. 1 is a side cross-sectional view of a liquid crystal display device according to a first embodiment.

The liquid crystal display device 10 overall has a rectangular shape in a plan view, and includes a hole portion 10a, as shown in FIG. 1. In each figure, a longitudinal direction of the liquid crystal display device 10 coincides with the X axis direction, a short side direction coincides with the Y axis direction, and a thickness direction coincides with the Z axis direction. The liquid crystal display device 10 mainly includes a liquid crystal panel (display panel) 11, an edge light type lighting device 20, and a casing 17 accommodating the same.

The liquid crystal panel 11 overall has a rectangular shape in a plan view. As shown in FIG. 1, the liquid crystal panel 11 includes a pair of glass substrates 11a, 11b excellent in light transmittance, a liquid crystal layer 11c sandwiched between the substrates 11a, 11b and containing liquid crystal molecules, which are substances in which optical properties change with electric field application, and an outer peripheral side seal portion 11d surrounding the liquid crystal layer 11c and interposed between outer peripheral ends of the pair of substrates 11a, 11b to seal the liquid crystal layer 11c.

As shown in FIG. 1, the liquid crystal panel 11 includes a display area (active area) 12A arranged at a central side of the front surface and where an image is displayed, a first non-display area (non-active area) 12B having a frame shape arranged on an outer peripheral side of the front surface so as to surround the display area 12A and where an image is not displayed, and a second non-display area 12C having a circular shape arranged in the display area 12A and where an image is not displayed. The liquid crystal panel 11 is provided with a panel hole portion 13, passing through in a thickness direction, at a location corresponding to the second non-display area 12C. The liquid crystal layer 11c surrounding the periphery of the panel hole portion 13 is sealed by a toric inner peripheral side seal portion 11e.

The liquid crystal panel 11 can display an image in the display area 12A in a visually recognizable state using the light supplied from the lighting device 20. A double-sided adhesive tape 14 is interposed between the liquid crystal panel 11 and the lighting device 20, and the liquid crystal panel 11 and the lighting device 20 are fixed to each other by the double-sided adhesive tape 14. The double-sided adhesive tape 14 has light blocking property, thus preventing the light leaking from the lighting device 20 from transmitting through the first non-display area 12B. The double-sided adhesive tape 14 preferably has a black surface to be adhered with respect to the liquid crystal panel 11, and a white surface to be adhered with respect to the lighting device 20. In the substrates 11a, 11b configuring the liquid crystal panel 11, the front side is a color filter (hereinafter referred to as CF) substrate 11a, and the back side is an array substrate 11b. Polarizing plates 11f, 11g are laminated to the outer side of the substrates 11a, 11b, respectively.

The array substrate 11b has a larger shape than the CF substrate 11a, and a dimension in the longitudinal direction of the array substrate 11b is set to be greater than the CF substrate 11a. One end in the short side direction of the array substrate 11b projects out toward the outer side of the end of the CF substrate 11a when the substrates 11a, 11b are overlapped. The projected end is attached with a driver 19 for driving the liquid crystal panel 11 and a flexible substrate (not illustrated). The driver 19 is directly COG (Chip On Glass) mounted with respect to the end to process various types of input signals provided from a panel drive circuit substrate (not shown) through the flexible substrate and provides the processed signals to the TFT in the display area 12A to be described later.

A TFT (Thin Film Transistor), which is a switching element, and a pixel electrode are arranged in a matrix form on an inner surface side (liquid crystal layer 11c side, opposing surface side with respect to CF substrate 11a) in the display area 12A of the array substrate 11b. Furthermore, a gate wiring and a source wiring forming a lattice form are arranged to surround the periphery of each TFT and the pixel electrode. A signal related to an image is provided by the driver 19 to the gate wiring and the source wiring. The pixel electrode includes a transparent conducting film made of ITO (Indium Tin Oxide), ZnO (Zinc Oxide), and the like.

A color filter is arranged at a position corresponding to each pixel on the inner surface side (liquid crystal layer 11c side, opposing surface side with respect to array substrate 11b) of the CF substrate 11a. The color filter has three color sections of R (red), G (green), and B (blue) alternately lined. A light blocking layer (black matrix) is formed between the color sections of the color filter. A counter electrode opposing the pixel electrode on the array substrate 11b side is arranged on the front surface of the color filter and the light blocking layer. The counter electrode includes a transparent conducting film, similar to the pixel electrode described above. An alignment film for aligning the liquid crystal molecules in the liquid crystal layer 11c is formed on the respective inner surface side of the substrates 11a, 11b.

As shown in FIG. 1, the casing 17 is configured by assembling a front side casing 17A and a back side casing 17B to each other, and the liquid crystal panel 11 and the lighting device 20 can be accommodated therebetween. Other than the above, substrates (not shown) such as a control substrate for controlling the drive of the liquid crystal panel 11, an LED drive substrate for supplying drive power to the LED 21, and the like, and a battery (not shown) and the like may be accommodated in the casing 17.

The front side casing 17A has a frame shape along an outer peripheral end of the liquid crystal panel 11, and is made from a metal material such as stainless steel and aluminum. The front side casing 17A includes a pressing portion 17Aa for pressing down the first non-display area 12B at the outer peripheral end of the liquid crystal panel 11 over the entire periphery from the front side, and a side wall portion 17Ab extending downward from the outer peripheral end of the pressing portion 17Aa and surrounding the periphery of the lighting device 20. The front side casing 17A holds the liquid crystal panel 11 with the lighting device 20 in a sandwiching manner.

The back side casing 17B has a substantially shallow box shape opened toward the front side (liquid crystal panel 11 side). The back side casing 17B is made from a metal material such as aluminum, a resin material, and the like. The back side casing 17B includes a plate-shaped bottom portion 17Ba having a similar shape to the liquid crystal panel 11 and the like in a plan view, and a plate-shaped side wall portion 17Bb rising toward the front side from the outer peripheral end of the bottom portion 17Ba and surrounding the periphery of the light guide plate 30 and the like.

Figure 2:
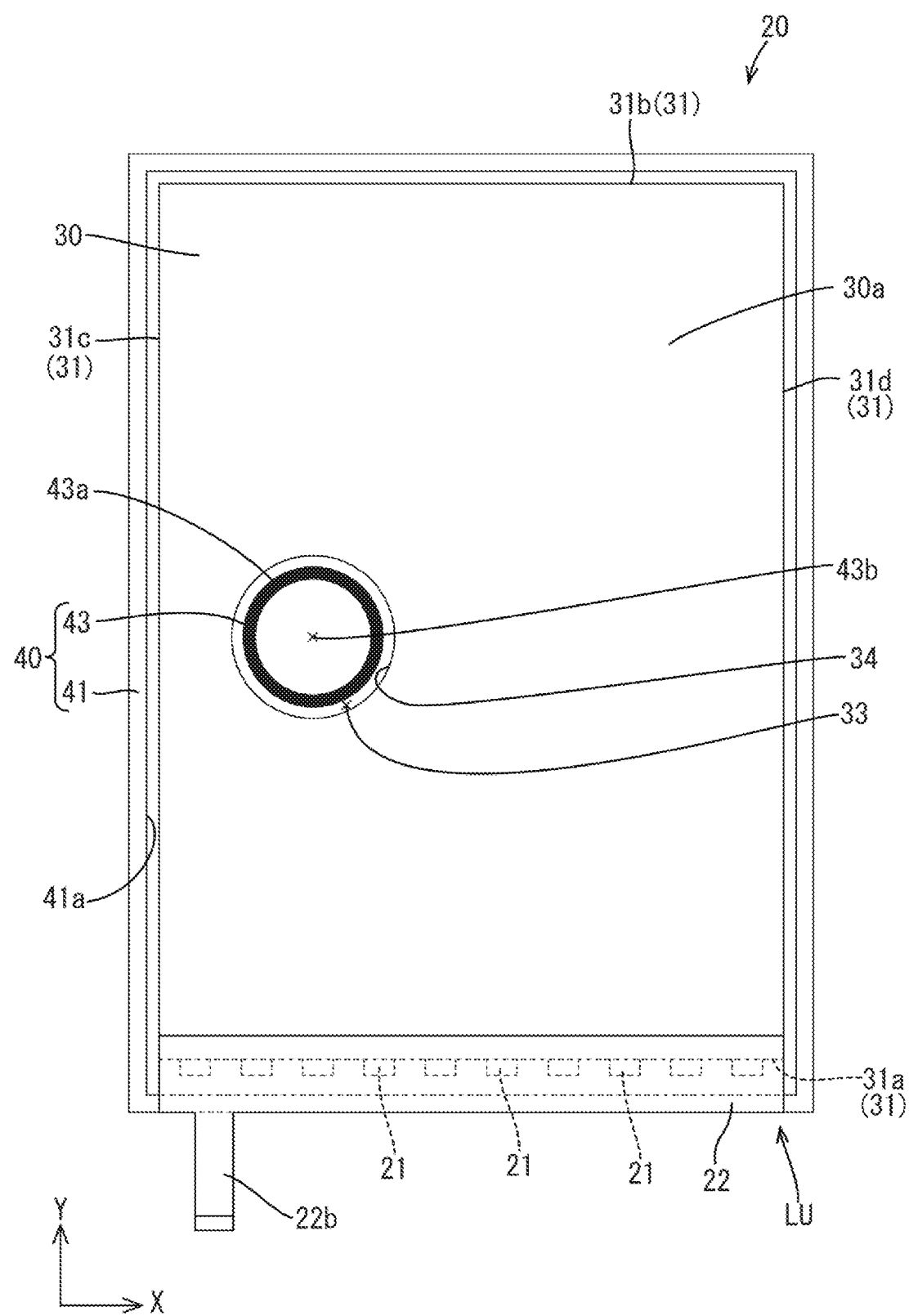
FIG. 2 is a plan view of a lighting device.

As shown in FIG. 2, the lighting device 20 has a rectangular shape in a plan view, similar to the liquid crystal panel 11, and emits light toward the rear surface side of the liquid crystal panel 11 to display a visually recognizable image on the display area 12A of the liquid crystal panel 11. The lighting device 20 is an edge light type, and includes an LED unit LU, the light guide plate 30, an optical sheet 24, a reflection sheet 26, a frame 40, and the like. In FIG. 2, the optical sheet 24 is omitted.

As shown in FIGS. 1 and 2, the LED unit LU includes an LED 21, and an LED substrate 22 on which the LED 21 is mounted. In the present embodiment, a configuration in which one end face on the long side of an outer peripheral end face 31 of the light guide plate 30 acts as the light entering surface 31a opposing the LED 21, and the LED unit LU is arranged on the light entering surface 31a side of the light guide plate 30 but not arranged on the other end face 31b side is illustrated. In such a lighting device 20, optical design is made in which light from the LED 21 exits from the light exiting surface 30a while forming a substantially uniform planar shape in a range from the light entering surface 31a to the other end face 31b by a light retrieving structure 36 and the like to be described later.

The LED 21 is obtained by sealing the LED chip (LED element), which is a semiconductor light emitting element, with a resin material. The LED 21 is a side light emitting type, and includes a light emitting surface 21*a* arranged perpendicular to the mounting surface 22*a* of the LED substrate 22 on which the LED 21 is mounted. The light emitting surface 21*a* is arranged to oppose the light entering surface 31*a* of the light guide plate 30 to be described later, while maintaining a predetermined spacing. An optical axis of the LED 21 extends in a normal direction of the light emitting surface 21*a*. When referring to "optical axis", this refers to an axis lying along an advancing direction of the light that, of all the light exiting from the LED 21 and having a predetermined light distributing portion, has the highest light emitting intensity.

As shown in FIG. 2, a plurality of LEDs 21 are mounted so as to be lined in a line on the LED substrate 22. Each LED 21 opposes the light entering surface 31*a* while maintaining an interval with each other. The LED 21 is arranged between an outer peripheral wall portion 41 of the frame 40 and the light entering surface 31*a* of the light guide plate 30 while being held by the LED substrate 22. Furthermore, the LED 21 is arranged between the mounting surface 22*a* of the LED substrate 22 and the reflection sheet 26 in the Z axis direction with the light emitting surface 21*a* in an orientation lying along the front and back direction (Z axis direction) of the liquid crystal display device 10.

As shown in FIG. 2, the LED substrate 22 includes a flexible band-shaped (long) member extending along the short side direction of the liquid crystal panel 11. The LED substrate 22 is fixed to the outer peripheral end of the liquid crystal panel 11 (outer peripheral end of the array substrate 11*b*) by way of the double-sided adhesive tape 14, described above, such that the mounting surface 22*a* on which the LED 21 is mounted opposes the reflection sheet 26. The mounting surface 22*a* of the LED substrate 22 is covered with a light reflection film having an insulating property. A wiring pattern (not shown) including a metal film of copper foil and the like is formed on the LED substrate 22, and the plurality of LEDs 21 mounted on the mounting surface 22*a* are connected in series by the wiring pattern. Furthermore, the LED substrate 22 is provided with an extending portion 22*b* extending toward the outer side from one part on the long side. The extending portion 22*b* has a connecting terminal provided at a distal end thereof, and the connecting terminal is electrically connected to a power supply circuit substrate (not shown) so that power is supplied to the LED 21 and the drive of the LED 21 is controlled. In FIG. 1, the illustration of the extending portion 22*b* is omitted.

As shown in FIGS. 1 and 2, the light guide plate 30 has a rectangular shape similar to the liquid crystal panel 11 and the like in a plan view. The light guide plate 30 is a plate-shaped member made from a transparent resin such as polycarbonate and acryl having a predetermined thickness. The light guide plate 30 is formed with a light guide plate hole portion (hole portion) 33 passing through in a thickness direction.

One end face in the longitudinal direction of the light guide plate 30 opposes the light emitting surface 21*a* of the LED 21, and acts as a light entering surface 31*a* to which the light from the light emitting surface 21*a* enters. The light entering surface 31*a* opposes an outer peripheral wall portion 41 of the frame 40 with the LED 21 present in between. Another end face 31*b* in the longitudinal direction of the light guide plate 30 and side end faces 31*c*, 31*d* in the short side direction directly oppose the outer peripheral wall portion 41 of the frame 40. In the present embodiment, such light entering surface 31*a*, the other end face 31*b*, and the side end faces 31*c*, 31*d* are collectively referred to as an outer peripheral end face 31.

The plate surface on the front side of the light guide plate 30 acts as the light exiting surface 30*a* through which the light guided from the light entering surface 31*a* into the light guide plate 30 exits toward the liquid crystal panel 11 side. The light exiting surface 30*a* surrounds a periphery of an open edge on a front side of the light guide plate hole portion 33. A back surface 30*b* of the light guide plate 30 is closely attached to the reflection sheet 26. The back surface 30*b* of the light guide plate 30 is formed with the light retrieving structure 36 including an embossed pattern and the like.

As shown in FIGS. 1 and 2, the light guide plate hole portion 33 include a circular column shaped internal space surrounded by the inner peripheral end face 34 of the light guide plate 30, and has a circular shape in a plan view. In the light guide plate 30, one plate surface acts as the light exiting surface 30*a*, and the light guide plate hole portion 33 acts as a non-light exiting portion through which the light does not exit. The light guide plate hole portion 33 is provided in communication with the panel hole portion 13 of the liquid crystal panel 11.

As shown in FIG. 1, the optical sheet 24 has a shape similar to the light guide plate 30 in a plan view, and is stacked on the light guide plate 30 so as to cover the light exiting surface 30*a*. The optical sheet 24 is formed with a circular optical sheet hole portion 25 passing through in the thickness direction at a position corresponding to the panel hole portion 13 of the liquid crystal panel 11 and the light guide plate hole portion 33 of the light guide plate 30. The optical sheet 24 is accommodated in the frame 40 so as to be interposed between the light guide plate 30 and the liquid crystal panel 11. The outer peripheral end of the optical sheet 24 is fixed to the liquid crystal panel 11 by way of the double-sided adhesive tape 14 along with the outer peripheral wall portion 41 of the frame 40 to be described later.

The optical sheet 24 includes a plurality of (three in the present embodiment) sheet-like members stacked one over the other. The optical sheet 24 has a function of transmitting the light exiting from the light exiting surface 30*a* toward the rear surface of the liquid crystal panel 11 and applying a predetermined optical effect on the light. A specific sheet type configuring the optical sheet 24 includes, for example, a diffuser sheet 24*a*, a lens sheet 24*b*, a reflection type polarizing sheet 24*c*, and the like, and selection is appropriately made therefrom. The light exiting from the light exiting surface 30*a* of the light guide plate 30 is converted to a more evenly spread light by being transmitted through the optical sheet 24.

As shown in FIG. 1, the reflection sheet 26 has a rectangular shape similar to the liquid crystal panel 11 and the like in a plan view. The reflection sheet 26 is, for example, configured by a sheet base member made of white synthetic resin (e.g., white foamed polyethylene terephthalate sheet), and has a front surface excellent in light reflecting property. The reflection sheet 26 includes a main body portion 26*a* covering the back surface 30*b* of the light guide plate 30, a light source arranging portion 26*b* bulging out from the main body portion 26*a* toward the LED 21 side and configuring a space for arranging the LED 21, and an outer peripheral end 26*c* extending to surround the outer periphery of the main body portion 26*a* and the light source arranging portion 26*b*. The main body portion 26*a* has an effect of reflecting the light exiting from the back surface 30*b* of the light guide plate 30 to the outer side, and again returning the light into the light guide plate 30 and raising the light toward the front side.

Similarly to the optical sheet 24, the reflection sheet 26 (main body portion 26a) is formed with a circular reflection sheet hole portion 27 passing through in the thickness direction at a position corresponding to the panel hole portion 13 of the liquid crystal panel 11 and the light guide plate hole portion 33 of the light guide plate 30. The periphery of the reflection sheet hole portion 27 and the outer peripheral wall portion 41 described above are fixed with respect to the frame 40. Specifically, the outer peripheral end 26c of the reflection sheet 26 is fixed to the outer peripheral wall portion 41 of the frame 40 to be described later, byway of the double-sided adhesive tape 28. Furthermore, the reflection sheet 26 has a toric double-sided adhesive tape 29 attached so as to surround the periphery of the reflection sheet hole portion 27, and the reflection sheet 26 is fixed to the inner peripheral wall portion 43 of the frame 40 by way of the double-sided adhesive tape 29. In other words, in the present embodiment, the outer peripheral wall portion 41 and the inner peripheral wall portion 43 formed separate from each other are integrated by being respectively fixed to the reflection sheet 26 in the frame 40.

As shown in FIGS. 1 and 2, the frame 40 is configured to surround the light guide plate 30. The frame 40 includes the outer peripheral wall portion 41 opposing the outer peripheral end face 31 of the light guide plate 30, and the inner peripheral wall portion 43 inserted to the light guide plate hole portion 33 and opposing the inner peripheral end face 34 of the light guide plate 30 on the inner side of the light guide plate hole portion 33.

As shown in FIG. 1, the outer peripheral wall portion 41 has a rectangular rim shape being one size larger than the light guide plate 30. The outer peripheral wall portion 41 is made of resin such as white polycarbonate and the like, and is configured with a member excellent in light reflecting property. The outer peripheral wall portion 41 plays a role of a housing for internally accommodating each configuring member as a structural member constituting an outermost shell of the lighting device 20.

The opposing surface 41a opposing the outer peripheral end face 31 of the light guide plate 30 of the outer peripheral wall portion 41 has a flat planar shape, and is configured to easily perform total reflection. The surface opposing the light entering surface 31a of the light guide plate 30 of the opposing surface 41a of the outer peripheral wall portion 41 forms an accommodating space for accommodating the LED 21 with the mounting surface 22a of the LED substrate 22 and the light source arranging portion 26b of the reflection sheet 26. The surfaces opposing each of the other end face 31b and the side end faces 31c, 31d of the light guide plate 30 of the opposing surface 41a of the outer peripheral wall portion 41 are arranged with a slight clearance space with respect to the light guide plate 30.

As shown in FIG. 1, the inner peripheral wall portion 43 has a circular rim shape (cylindrical shape) being one size smaller than the light guide plate hole portion 33 of the light guide plate 30 and includes a frame hole portion 43b on an inner side. The inner peripheral wall portion 43 has a toric double-sided adhesive tape 15 attached to the upper surface. The double-sided adhesive tape 15 is also attached to the liquid crystal panel 11 so as to surround the periphery of the panel hole portion 13. That is, the double-sided adhesive tape 15 fixes the frame 40 and the liquid crystal panel 11 to each other such that the frame hole portion 43b and the panel hole portion 13 communicate while being sandwiched between the inner peripheral wall portion 43 and the liquid crystal panel 11.

The inner peripheral wall portion 43 is configured with a member made of resin, such as black polycarbonate and the like, and excellent in light absorbing property. Furthermore, the inner peripheral wall portion 43 is configured by a member having low light transmitting property, and can suppress the light leakage from the light guide plate hole portion 33.

The inner peripheral wall portion 43 is configured such that the opposing surface 43a opposing the inner peripheral end face 34 of the light guide plate 30 has a lower light reflectivity than that of the opposing surface 41a of the outer peripheral wall portion 41. The light reflectivity is correlated with the peripheral brightness in a ray trace simulation to be described later. Furthermore, the opposing surface 43a of the inner peripheral wall portion 43 has a rough surface, and is configured to diffuse and reflect light more easily than the opposing surface 41a of the outer peripheral wall portion 41. Specifically, the opposing surface 43a of the inner peripheral wall portion 43 has a surface roughness (Ra) set to 0.1 or greater.

The liquid crystal display device 10 having each structure described above is formed with a hole portion 10a passing through in the thickness direction at a position corresponding to the second non-display area 12C of the liquid crystal panel 11. The hole portion 10a is formed by a continuation of the panel hole portion 13 of the liquid crystal panel 11 and the hole portion of the lighting device 20, that is, the optical sheet hole portion 25 of the optical sheet 24, the light guide plate hole portion 33 of the light guide plate 30, and the reflection sheet hole portion 27 of the reflection sheet 26, and has the inner peripheral wall portion 43 of the frame 40 including the frame hole portion 43b inserted on the inner side thereof. A function component (not shown) configuring the liquid crystal display device 10 is inserted to the frame hole portion 43b and the panel hole portion 13. For such other members, for example, when providing a needle of a meter on a display surface of the liquid crystal display device, a component related to the drive of the needle (e.g., shaft member coupling the needle and the driving component) can be illustrated as an example.

In the liquid crystal display device 10 described above, each LED 21 of the LED unit LU of the lighting device 20 emits light (turned ON) when displaying an image in the display area 12A of the liquid crystal panel 11. When each LED 21 emits light, the light enters the light guide plate 30 from the light entering surface 31a of the light guide plate 30. The entering light is, for example, reflected by the reflection sheet 26 laid on the back side of the light guide plate 30 and by the light retrieving structure 36 formed on the back surface 30b of the light guide plate 30, advances through the light guide plate 30, and exits from the light exiting surface 30a including the plate surface on the front side of the light guide plate 30. The light does not exit from the non-exiting portion including the light guide plate hole portion 33 formed in the light guide plate 30. The light exiting from the light exiting surface 30a passes through the optical sheet 24 and becomes a planarly spread light to light the rear surface of the liquid crystal panel 11. The liquid crystal panel 11 then displays the image in the display area 12A in a visually recognizable state using the light from the lighting device 20.

Figure 3:
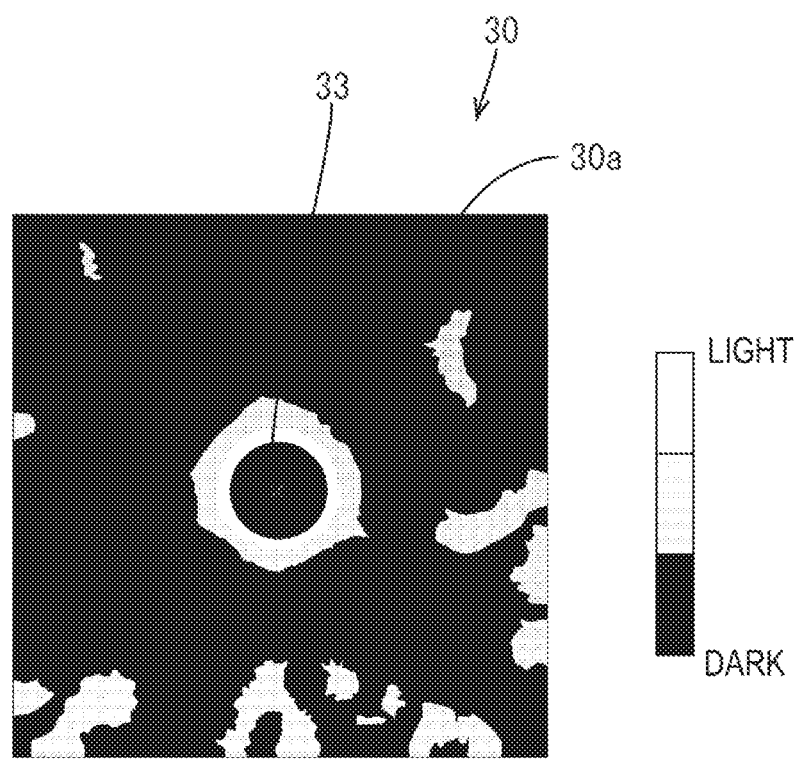
FIG. 3 is a view showing a brightness distribution of light exiting from the lighting device at a periphery of a hole portion.

FIG. 3 is a view showing a result of analyzing a brightness distribution of the light exiting from the lighting device 20 according to the ray trace simulation. As shown in FIG. 3, the brightness of the light exiting from the portion corresponding to the display area 12A of the lighting device 20 is substantially uniform. The periphery of the light guide plate hole portion 33 corresponding to the second non-display area 12C has a slightly higher brightness than the other portions, but the uneven brightness (difference in brightness) with the other portions is small and the range of the area of high brightness is reduced compared to a comparative example to be described later.

Figure 4:
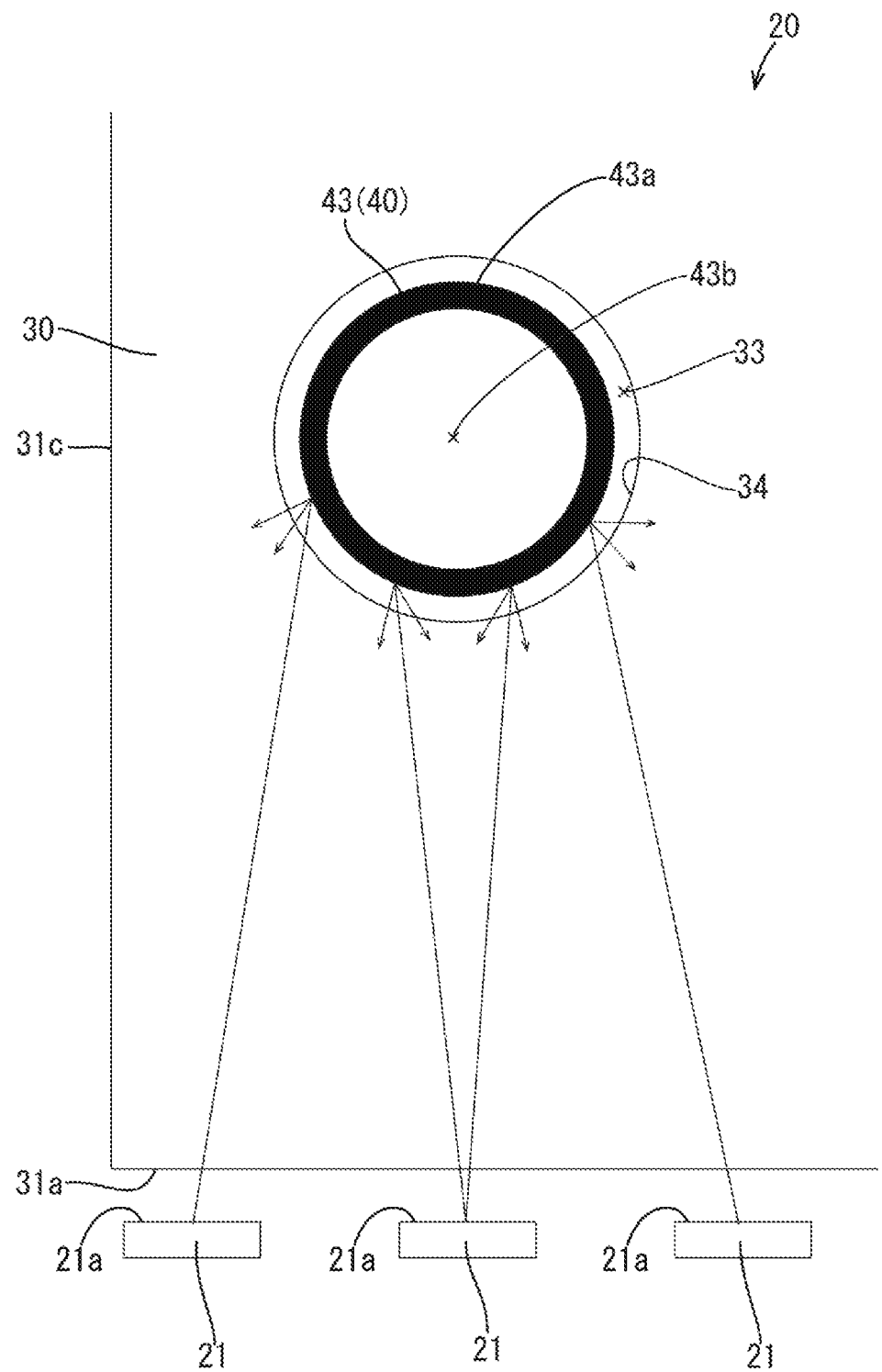
FIG. 4 is an explanatory view schematically showing a state of propagating light exiting from an LED.

The principle in which the uneven brightness is suppressed in the lighting device 20 of the liquid crystal display device 10 of the present embodiment will be described with reference to FIG. 4 and the like. FIG. 4 is an explanatory view showing a state in which the light exiting from the LED 21 is reflected by the inner peripheral wall portion 43. In FIG. 4, the light exiting from the LED 21 is schematically shown with an arrow.

The lighting device 20 is designed such that the majority of the light from the plurality of LEDs 21 of the LED unit LU arranged on the light entering surface 31a side of the light guide plate 30 exits from the light exiting surface 30a while being guided to the other end face 31b. Thus, a great amount of light leaks out from the inner peripheral end face 34 at the light guide plate hole portion 33 arranged so as to be interposed between the light entering surface 31a and the other end face 31b of the light guide plate 30. The light leakage is particularly large at the portion on the light entering surface 31a side of the inner peripheral end face 34.

Of all the light exiting from the LED 21, the light leaking out from the inner peripheral end face 34 advances toward the inner peripheral wall portion 43 of the frame 40. In particular, most of the light from the LED 21 arranged at a position where the optical axis overlaps the light guide plate hole portion 33 directly advances toward the inner peripheral wall portion 43 along the optical axis. Furthermore, the light raised toward the light exiting surface 30a side by the back surface 30b of the light guide plate 30 (light retrieving structure 36) and by the reflection sheet 26 advances toward the inner peripheral wall portion 43 while being directed toward the light exiting surface 30a side. The opposing surface 43a of the inner peripheral wall portion 43 is configured to have low light reflectivity and low light transmittance, and most of the light is absorbed by the inner peripheral wall portion 43. The light reflected by the inner peripheral wall portion 43 of the light advancing toward the inner peripheral wall portion 43 is diffused and reflected at the opposing surface 43a having a rough surface, so that the directivity toward a specific direction (e.g., light exiting surface 30a side) is weakened. Thus, of all the light reflected by the inner peripheral wall portion 43, the light amount advancing toward the light exiting surface 30a side can be reduced as compared to when the light advancing toward the inner peripheral wall portion 43 is totally reflected at the opposing surface 43a of the inner peripheral wall portion 43. As a result, a hot spot where the brightness is locally high is less likely to be generated at a hole edge of the light guide plate hole portion 33 of the light guide plate 30 in the present embodiment.

Of all the light exiting from the LED 21, the light leaking out from the outer peripheral end face 31 advances toward the outer peripheral wall portion 41 of the frame 40. The opposing surface 41a of the outer peripheral wall portion 41 has a configuration of high light reflectivity, and most of the light is reflected by the outer peripheral wall portion 41. The light reflected by the opposing surface 41a re-enters the light entering surface 31a, the other end face 31b, and the side end faces 31c, 31d of the light guide plate 30 opposing thereto. In particular, the light totally reflected by the opposing surface 41a of the outer peripheral wall portion 41 having flatness has a directivity of easily entering the light guide plate 30. As a result, in the present embodiment, of all the light leaking out from the outer peripheral end face 31 of the light guide plate 30, the light amount returned again to the light guide plate 30 can be increased, and the proportion of the light exiting from the light exiting surface 30a of the light guide plate 30 of the light from the LED 21 can be increased compared to the configuration not including the outer peripheral wall portion 41. That is, in the present embodiment, the usage efficiency of the light in the lighting device 20 can be enhanced and the lighting device 20 of higher brightness and lower power consumption can be realized compared to the configuration not including the outer peripheral wall portion 41. Furthermore, the light reflected at the surface opposing the other end face 31b in the outer peripheral end face 31 of the opposing surface 41a advances toward an area on an opposite side of the LED 21 with respect to the light guide plate hole portion 33 in the light guide plate 30. As a result, in the present embodiment, the brightness of the relevant area can be suppressed from becoming locally low.

As described above, the lighting device 20 of the present embodiment includes the LED 21; the light guide plate 30 configured with a plate-shaped member including the light guide plate hole portion 33 passing through in the thickness direction, the light guide plate 30 including the light entering surface 31a which is constituted of the outer peripheral end face 31 of the plate-shaped member and to which the light from the LED 21 enters and the light exiting surface 30a which is constituted of the front surface of the plate-shaped member and through which the light entering through the light entering surface 31a exits; and the frame 40 surrounding the light guide plate 30, the frame 40 including the outer peripheral wall portion 41 opposing the outer peripheral end face 31 of the light guide plate 30 and the inner peripheral wall portion 43 inserted to the light guide plate hole portion 33 and opposing the inner peripheral end face 34 of the light guide plate 30 on the inner side of the light guide plate hole portion 33 and having a configuration in which the opposing surface 43a has a lower light reflectivity than that of the opposing surface 41a of the outer peripheral wall portion 41.

According to the present embodiment, the light reflectivity of the opposing surface 43a of the inner peripheral wall portion 43 is low compared to the opposing surface 41a of the outer peripheral wall portion 41, and thus an event in which the light leaking out from the inner peripheral end face 34 of the light guide plate is reflected at the opposing surface 43a of the inner peripheral wall portion 43 and exits from the hole edge of the light guide plate hole portion 33 can be suppressed compared to when the light reflectivity is the same. The light leaking out from the outer peripheral end face 31 of the light guide plate 30 can again enter the light guide plate efficiently by configuring the opposing surface 41a of the outer peripheral wall portion 41 so as to have a higher light reflectivity than that of the opposing surface 43a of the inner peripheral wall portion 43. As a result, the region where the brightness is locally high can be suppressed from being formed at the periphery of the light guide plate hole portion 33 while suppressing the reduction in the brightness in the lighting device 20.

As a different means for suppressing the region where the brightness is locally high from being formed at the periphery of the light guide plate hole portion 33, a design of causing all the light entering the light entering surface 31a to exit from the light exiting surface 30a before reaching the light guide plate hole portion 33 is considered. As one example of such design, a configuration of setting the density of the light retrieving structure 36 to be higher at only a perpendicular line region connecting the light guide plate hole portion 33 and the light entering surface 31a so as to be orthogonal to the light entering surface 31a of the light guide plate 30 than a peripheral region thereof is considered. However, the distance from the light entering surface 31a to the light guide plate hole portion 33 is short compared to the distance from the light entering surface 31a to the other end face 31b, and thus it is difficult to cause all the light to exit, even if the light retrieving structure 36 is formed most densely. Furthermore, even if all the light entering the light entering surface 31a can exit from the light exiting surface 30a before reaching the light guide plate hole portion 33, in such a case, the brightness of the perpendicular line region becomes higher than the peripheral region thereof and a uniformity ratio of the brightness may be reduced. In the present embodiment, on the other hand, the uneven brightness of the lighting device 20 can be suppressed simply through a simple means of appropriately changing the light reflectivity of the inner peripheral wall portion 43 of the frame 40 without a complex optical design such as changing the density of the light retrieving structure 36 of the perpendicular line region from the peripheral region.

Furthermore, according to the present embodiment, the light reflectivity of the opposing surface 43a of the inner peripheral wall portion 43 can be suitably reduced as the inner peripheral wall portion 43 has the opposing surface 43a formed black.

Moreover, according to the present embodiment, as the outer peripheral wall portion 41 has the opposing surface 43b formed white, the light reflectivity of the opposing surface 43b can be set high and the reduction in brightness can be suitably suppressed at the outer peripheral wall portion 41 where the problem of uneven brightness is less likely to occur compared to the inner peripheral wall portion 43.

The liquid crystal display device 10 according to the present embodiment includes: the lighting device 20; and the liquid crystal panel 11 having the display area 12A that is arranged on the light exiting side of the lighting device 20 and that carries out display using light from the lighting device 20, and the second non-display area 12C that is arranged in the display area 12A and corresponds to the position of the light guide plate hole portion 33, and where the image is not displayed. Thus, the lighting device 20 can be applied to the liquid crystal display device 10 equipped with the liquid crystal panel 11 in which the second non-display area 12C is arranged in the display area 12A.

COMPARATIVE EXAMPLE

Next, a lighting device 20P according to a comparative example of the present invention will be described with reference to FIGS. 5 and 6. Configurations corresponding to the first embodiment in the lighting device 20P of the comparative example are denoted with reference symbols similar to the first embodiment but with an index "P" added thereto.

Figure 5:
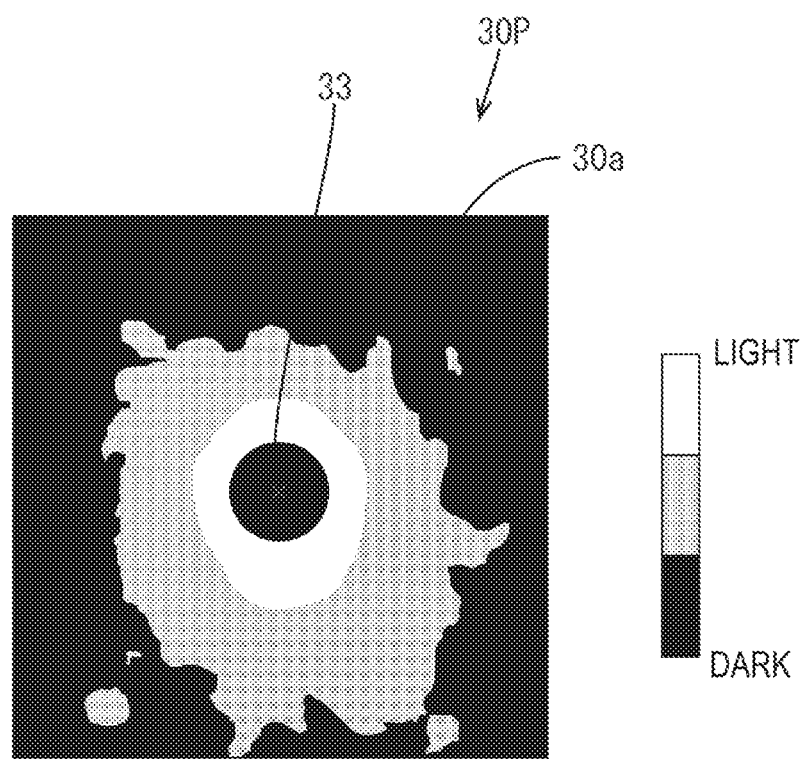
FIG. 5 is a view showing a brightness distribution of light exiting from the lighting device at a periphery of a hole portion in a comparative example.
Figure 6:
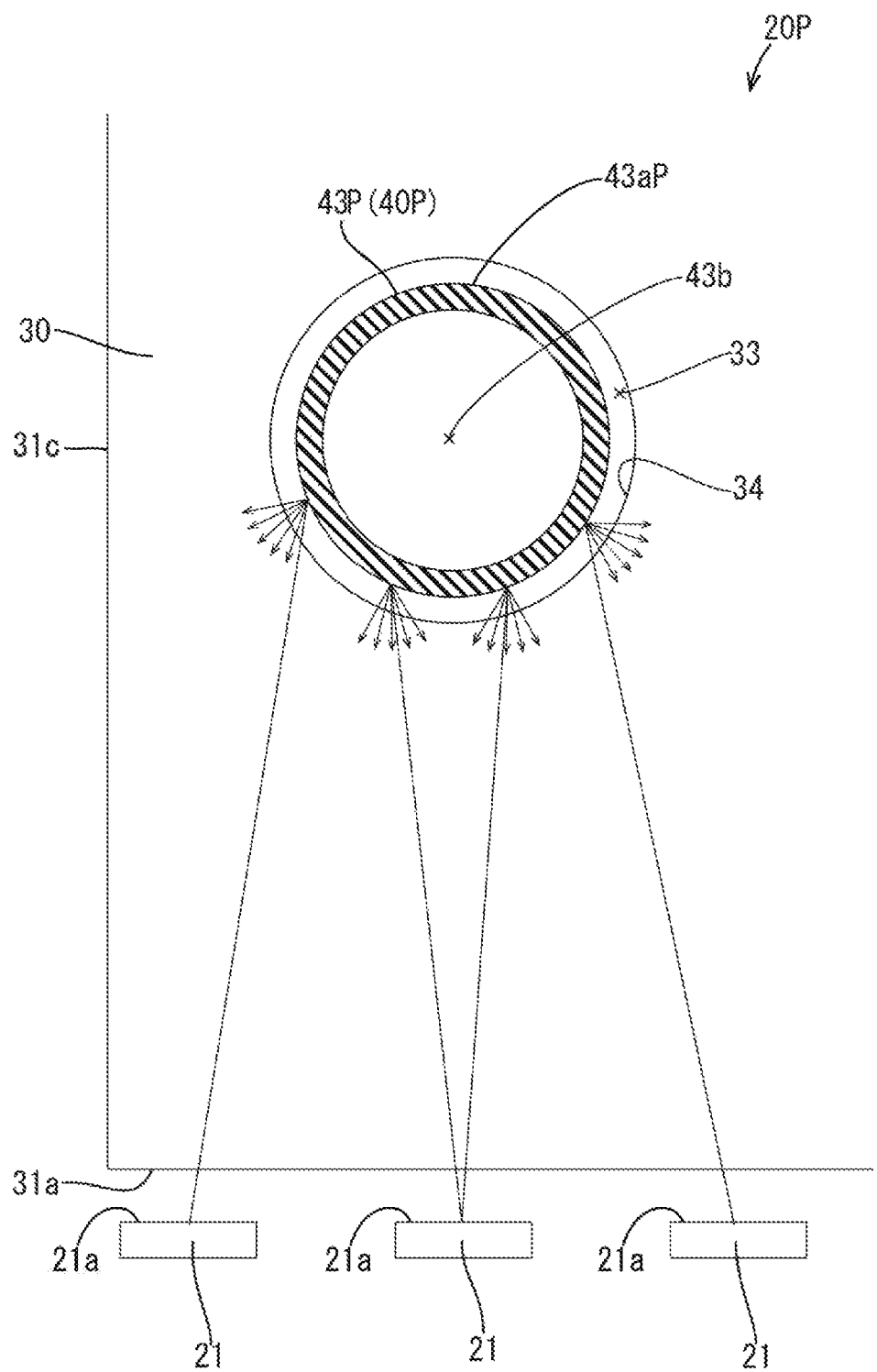
FIG. 6 is an explanatory view schematically showing a state of propagating light exiting from an LED in the comparative example.

FIG. 5 is a view showing a result of analyzing the brightness distribution of the light exiting from the lighting device 20P according to the ray tracing simulation. In FIG. 5, the brightness distribution of the light exiting from the lighting device 20P is shown. FIG. 6 is an explanatory view schematically showing a state in which the light exiting from the LED 21 is reflected by an inner peripheral wall portion 43P.

In the lighting device 20P, the light reflectivity of an opposing surface 43aP of the inner peripheral wall portion 43P of a frame 40P is the same as that of an opposing surface 41aP of an outer peripheral wall portion 41P. Specifically, the inner peripheral wall portion 43P is configured by a member that is made of resin such as white polycarbonate, similarly to the outer peripheral wall portion 41P, and that is excellent in light reflecting property. Other basic structures of the lighting device 20P are similar to the first embodiment.

As shown in FIG. 5, unevenness occurs in the brightness of the light exiting from a portion corresponding to the display area 12A in the lighting device 20P. In particular, a hot spot where the brightness is locally high is generated at the hole edge of the light guide plate hole portion 33 of the light guide plate 30. Thus, in the lighting device 20P of the comparative example, occurrence of a significantly uneven brightness was confirmed.

In the lighting device 20P, of all the light exiting from the LED 21, the light leaking out from the inner peripheral end face 34 advances toward the inner peripheral wall portion 43P of the frame 40P. In particular, most of the light from the LED 21 arranged at a position where the optical axis overlaps the light guide plate hole portion 33 directly advances toward the inner peripheral wall portion 43P along the optical axis. In FIG. 6, the light exiting from the LED 21 is schematically shown with an arrow. Furthermore, the light raised toward the light exiting surface 30a side with the back surface 30b of the light guide plate 30 and the reflection sheet 26 advances toward the inner peripheral wall portion 43P while being directed toward the light exiting surface 30a. The opposing surface 43aP of the inner peripheral wall portion 43P is configured to have high light reflectivity, and thus most of the light is reflected by the inner peripheral wall portion 43P. Some of the light advancing from the LED 21 to the inner peripheral wall portion 43P along the optical axis and being scattered and reflected by the opposing surface 43aP advances toward the light exiting surface 30a side. Furthermore, the majority of the light advancing toward the inner peripheral wall portion 43P while being directed toward the light exiting surface 30a side and totally reflected by the opposing surface 43aP advances toward the light exiting surface 30a. As a result, in the present embodiment, the hot spot where the brightness is locally high is easily generated at the hole edge of the light guide plate hole portion 33 of the light guide plate 30 side.

Second Embodiment

A liquid crystal display device 110 (lighting device 120) according to a second embodiment will be described with reference to FIG. 7. The liquid crystal display device 110 differs from the first embodiment in that a light guide plate 130 has a substantially toric shape in a plan view. The same reference numerals are denoted on portions same as the first embodiment, and redundant description will be omitted.

Figure 7:
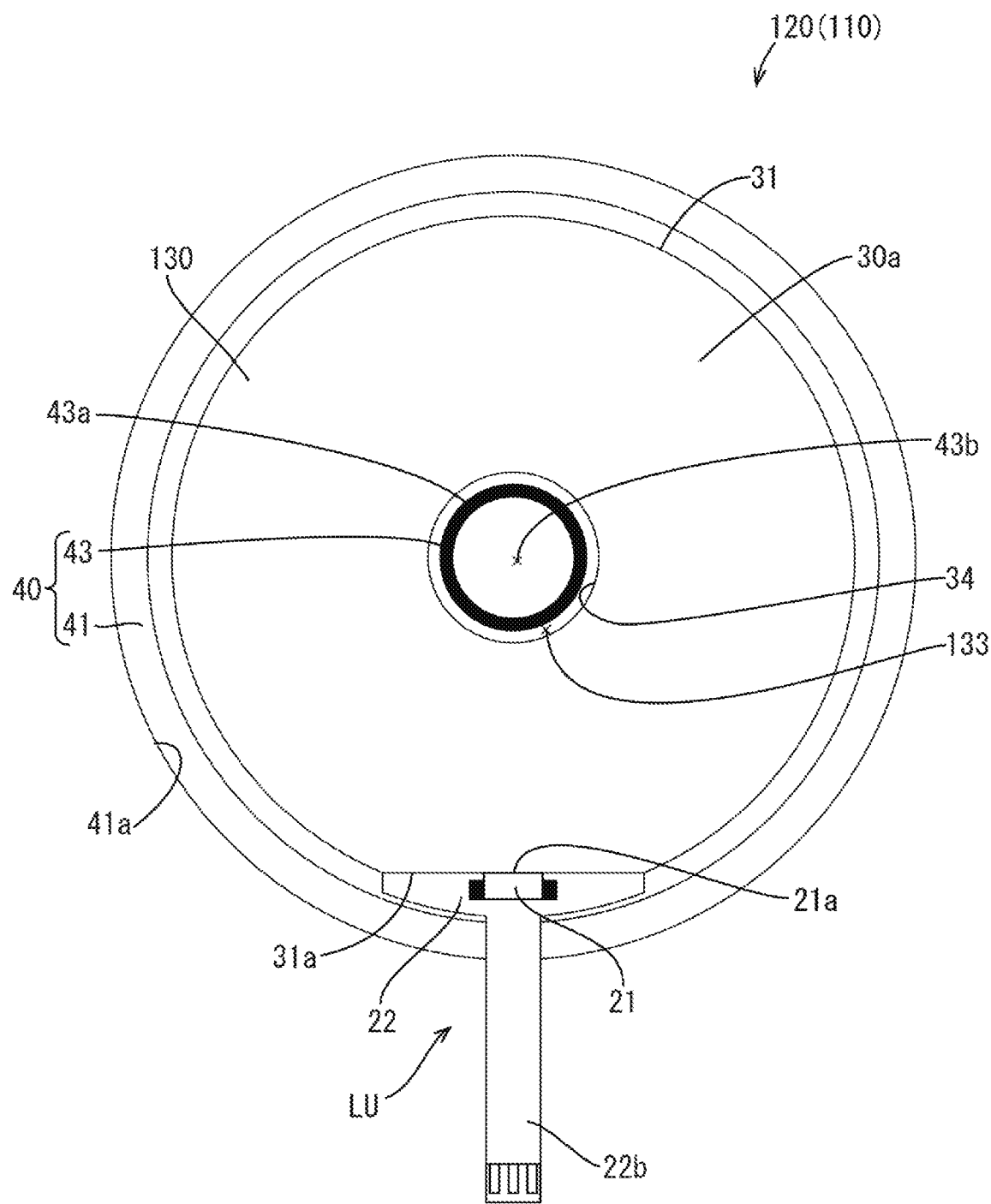
FIG. 7 is a plan view of a lighting device according to a second embodiment.

As shown in FIG. 7, the light guide plate 130 includes a circular light guide plate hole portion 133 at the center, and also includes the light entering surface 31a having a shape in which a peripheral end is cut out to an arc shape. One LED 21 is arranged in the vicinity of the center of the light entering surface 31a so as to oppose thereto. In the present embodiment, a configuration in which the LED substrate 22 is arranged on the back surface 30b side with respect to the light guide plate 130 is illustrated.

In the configuration in which the light guide plate 130 has a substantially toric shape, the configuration in which the LED 21 and the inner peripheral wall portion 43 are arranged opposing each other is easily obtained, and in particular, the region on the LED 21 side at the periphery of the light guide plate hole portion 133 tends to easily become the region where the brightness is locally high. In the present embodiment, on the other hand, a configuration in which the opposing surface 43a of the inner peripheral wall portion 43 has a lower light reflectivity than that of the opposing surface 41a of the outer peripheral wall portion 41 is adopted, so that the region where the brightness is locally high can be suitably suppressed from being formed.

Third Embodiment

Figure 8:
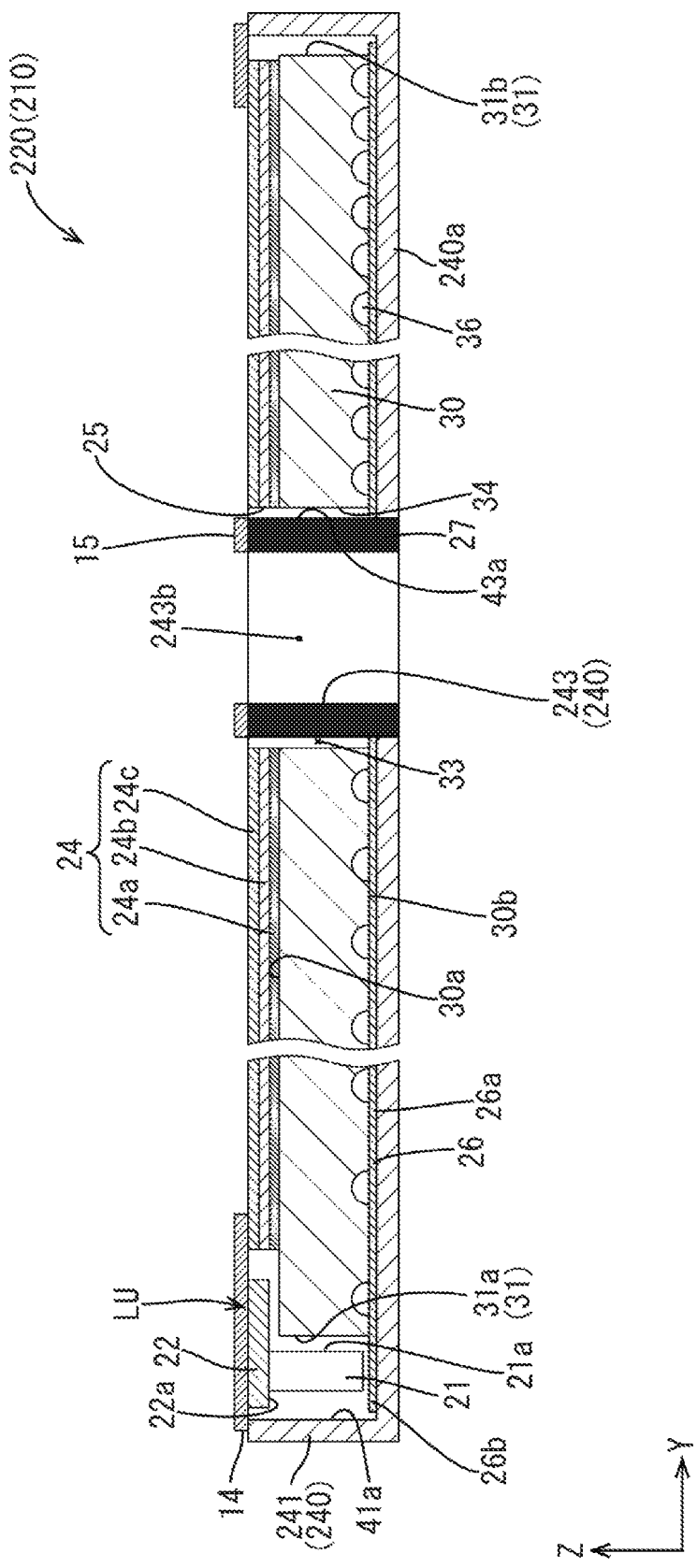
FIG. 8 is a cross-sectional view of a lighting device according to a third embodiment.

Next, a liquid crystal display device 210 (lighting device 220) according to a third embodiment will be described with reference to FIG. 8. The liquid crystal display device 210 of the present embodiment differs from the first embodiment in the configuration of a frame 240. The same reference numerals are denoted on portions same as the first embodiment, and redundant description will be omitted.

The frame 240 has a substantially box shape (tray shape), and has a bottom surface portion 240a including a frame hole portion 243b, an outer peripheral wall portion 241 raised from the outer peripheral end of the bottom surface portion 230a, and an inner peripheral wall portion 243 raised from the inner peripheral end of the bottom surface portion 240a integrally formed. The bottom surface portion 240a and the outer peripheral wall portion 241, and the inner peripheral wall portion 243 are integrally molded by two-color molding. Each configuration of the outer peripheral wall portion 241 and the inner peripheral wall portion 243 are similar to each configuration of the outer peripheral wall portion 41 and the inner peripheral wall portion 43, and hence the description thereof will be omitted.

Fourth Embodiment

Next, a liquid crystal display device 310 (lighting device 320) according to a fourth embodiment will be described with reference to FIGS. 9 to 11. The liquid crystal display device 310 of the present embodiment differs from the embodiments described above in the configuration of a double-sided adhesive tape 315 (one example of light blocking member). The same reference numerals are denoted on portions same as the embodiments described above, and redundant description will be omitted.

Figure 9:
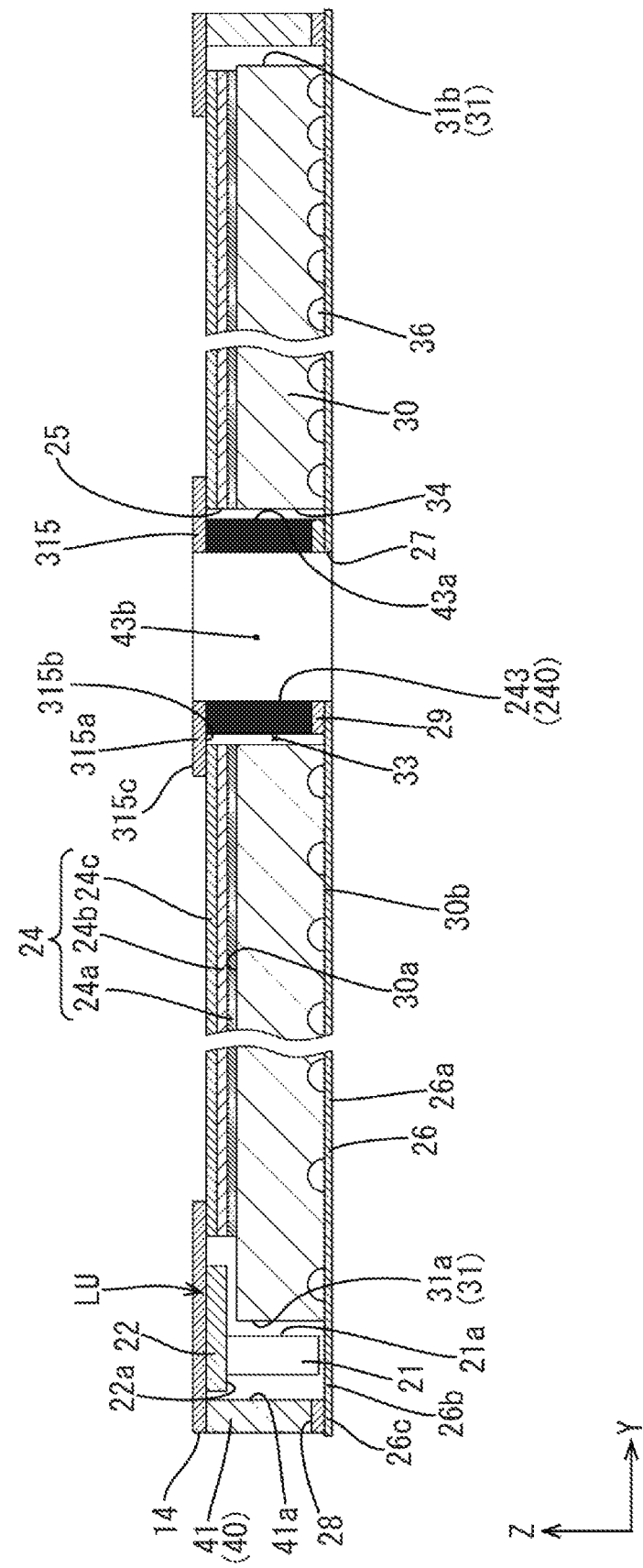
FIG. 9 is a cross-sectional view of a lighting device according to a fourth embodiment.
Figure 10:
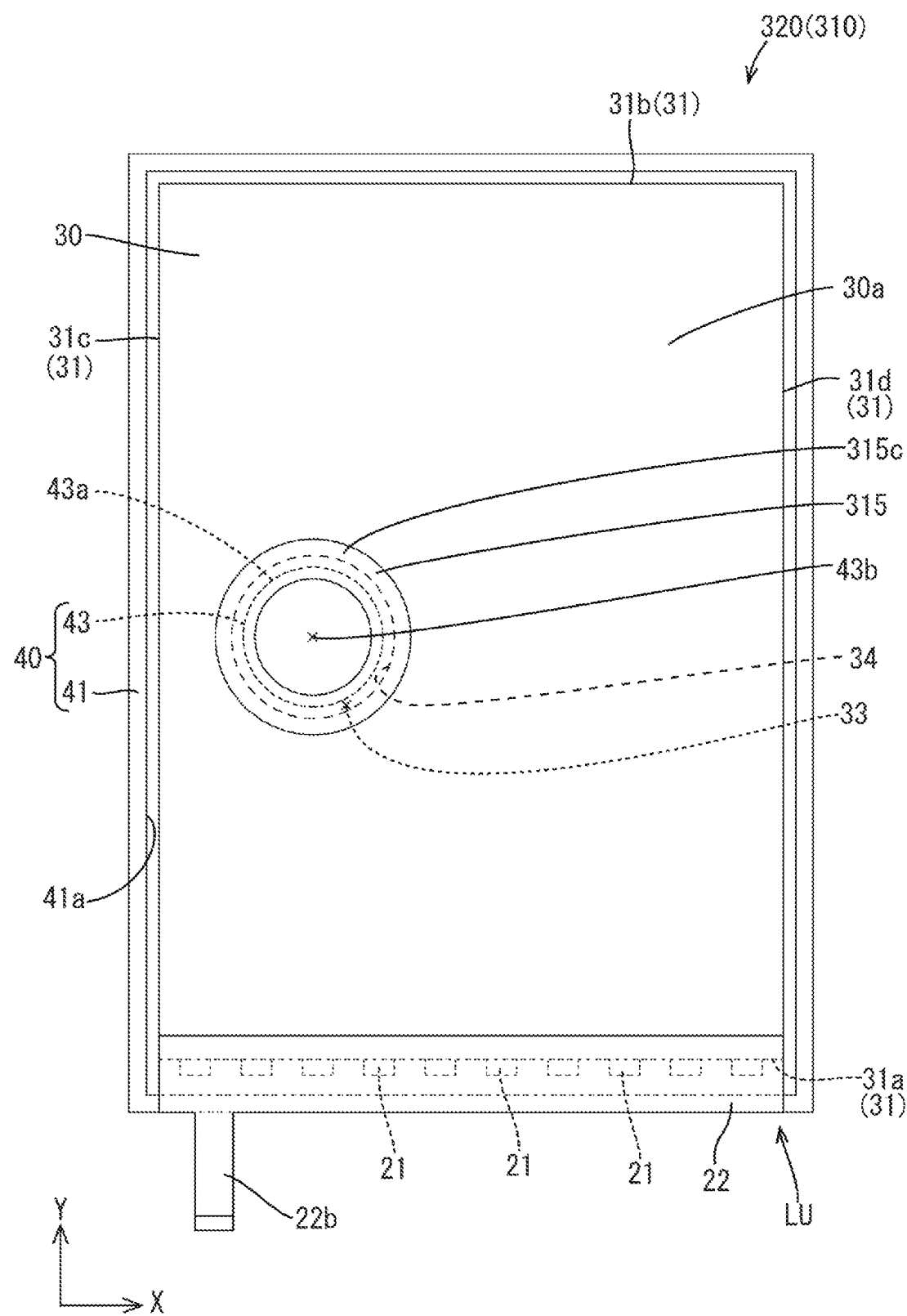
FIG. 10 is a plan view of a lighting device of FIG. 9.
Figure 11:
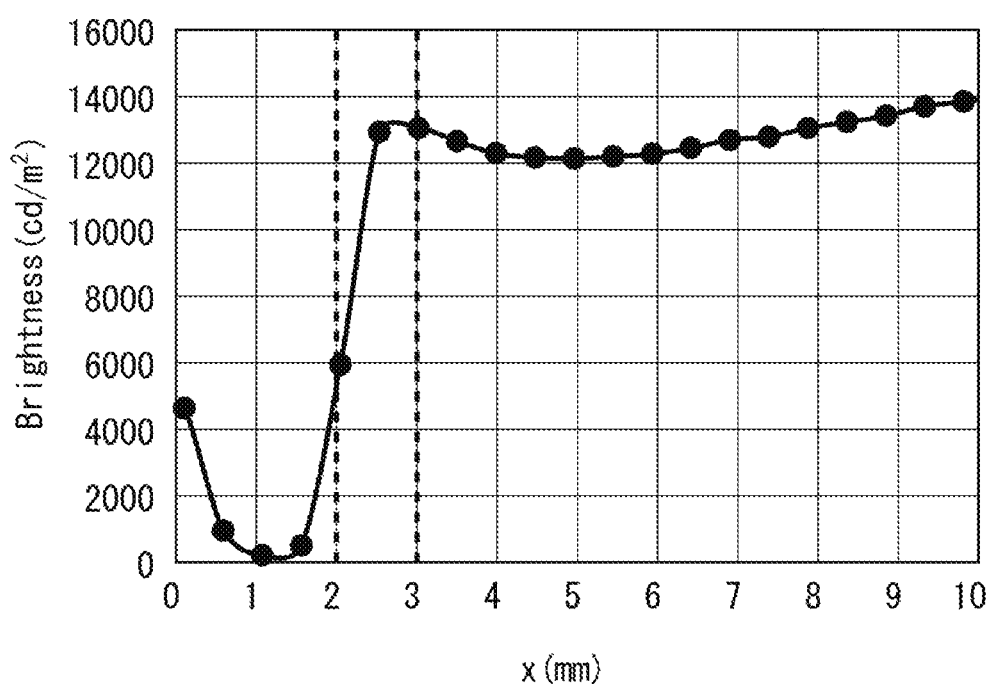
FIG. 11 is a graph showing an actual measurement value of the brightness when the light blocking member is not arranged.

As shown in FIGS. 9 and 10, the double-sided adhesive tape 315 is arranged to cover the hole edge of the light guide plate hole portion 33 of the light guide plate 30 from the light exiting surface 30a side, and functions as a light blocking member for blocking the light exiting from the hole edge. The double-sided adhesive tape 315 has a toric shape, and is configured such that the inner peripheral end overlaps the upper surface of the inner peripheral wall portion 43 of the frame 40, and the outer peripheral end overlaps the hole edge of the light guide plate hole portion 33 of the light guide plate 30 by way of the optical sheet 24. That is, the double-sided adhesive tape 315 has a configuration of collectively covering the periphery of the inner peripheral wall portion 43, that is, the clearance between the opposing surface 43a of the inner peripheral wall portion 43 and the inner peripheral end face 34 of the light guide plate hole portion 33 of the light guide plate 30, and the hole edge of the light guide plate hole portion 33 from the light exiting surface 30a side.

The double-sided adhesive tape 315 has a width dimension set to a dimension with which a hot spot generating region at the hole edge of the light guide plate hole portion 33 can be covered. FIG. 11 is a graph showing a measurement result of the brightness of the lighting device not including the double-sided adhesive tape 315 (inner peripheral wall portion 43: black polycarbonate, thickness dimension of light guide plate 30: 0.4 mm, distance (g1) between inner peripheral end face 34 of light guide plate 30 and opposing surface 43a of inner peripheral wall portion 43: 0.1 mm). The X axis is a position from the light guide plate hole portion 33, where the position of 2 mm corresponds to the position of the inner peripheral end face 34, a range of 2 mm or smaller corresponds to an inner side of the light guide plate hole portion 33, and a range of 2 mm or greater corresponds to an outer side of the light guide plate hole portion 33. Y axis is an actual measurement value ($cd/m^2$) of the brightness at the relevant position. As shown in FIG. 11, the hot spot is generated in a range of 2 mm to 3 mm in the X axis, that is, a range (dimension of which is assumed as HS) of about 1 mm from the inner peripheral end face 34 of the light guide plate 30. Thus, in the present embodiment, the double-sided adhesive tape 315 is preferably set to a dimension with which the region having a 1 mm width from the inner peripheral end face 34 at the periphery of the light guide plate hole portion 33 can be covered. As the thickness dimension (w1) of the inner peripheral wall portion 43 is 0.5 mm, the double-sided adhesive tape 315 preferably has the width dimension thereof set to about 1.6 mm, which is the sum of w1, g1, and HS.

The double-sided adhesive tape 315 is configured to include a sheet-like base member 315a, a first adhesive layer (one example of adhesive layer) 315b formed on the back surface side of the base member (light guide plate 30 and inner peripheral wall portion 43 of frame 40 with respect to base member 315a) side, and a second adhesive layer 315c formed on the front surface side of the base member 315a (liquid crystal panel 11 with respect to base member 315a) side. The base member 315a is made of black polyethylene terephthalate resin having light blocking property. The first adhesive layer 315b and the second adhesive layer 315c are made from acrylic adhesive paste. In suppressing the uneven brightness of the lighting device 20, the first adhesive layer 315b is preferably a black adhesive layer, and furthermore, both the first adhesive layer 315b and the second adhesive layer 315c are preferably black adhesive layers. The operation of the double-sided adhesive tape 315 will be described below.

In the liquid crystal display device 310 including the hole portion 10a, the configuration not including the double-sided adhesive tape 315 has the following problems. Firstly, when the optical sheet hole portion 25 and the inner peripheral end face of the light guide plate hole portion 33 face the front side (light exiting side) of the lighting device, the light emission of the inner peripheral end face and the light leakage from the inner peripheral end face become factors of uneven brightness. Secondly, as with the configuration disclosed in the first embodiment, for example, an event in which a strong hot spot is generated at the periphery of the light guide plate hole portion 33 can be suppressed with the configuration in which the inner peripheral wall portion 43 of the frame 40 has a low light reflectivity, but even in such a case, a very slight hot spot is generated. Thirdly, in a state where the liquid crystal panel 11 and the lighting device 320 are not sealed at the periphery of the panel hole portion 13, the display quality of the liquid crystal display device 310 may be reduced by the foreign substances that enter through the panel hole portion 13. Furthermore, even if the liquid crystal display device 310 includes the double-sided adhesive tape, the configuration in which the double-sided adhesive tape includes the white base member 315a and the transparent first adhesive layer 315b has the following problems. In such configuration, the light scattered and reflected by the base member 315a is propagated through the interior of the first adhesive layer 315b and exits from the outer peripheral end thereof, and thus the outer peripheral edge of the double-sided adhesive tape 315 appears to be linearly emitting light, which tends to be visually recognized as the hot spot.

According to the present embodiment, on the other hand, the double-sided adhesive tape 315 covers the optical sheet hole portion 25 and the inner peripheral end face of the light guide plate hole portion 33 from the light exiting surface 30a side, and thus the light of the inner peripheral end face can be blocked with the double-sided adhesive tape 315. Furthermore, by covering the hot spot itself that is generated very slightly at the periphery of the light guide plate hole portion 33 from the light exiting surface 30a side, an event in which the hot spot is visually recognized as the uneven brightness can be suppressed. In this case, in the present embodiment, the base member 315a and the first adhesive layer 315b (and second adhesive layer 315c) of the double-sided adhesive tape 315 are formed black, a color excellent in light absorbing property, and thus the light amount scattered and reflected by the double-sided adhesive tape 315 can be reduced, and the event in which the outer peripheral edge of the double-sided adhesive tape 315 appears to be linearly emitting light can be suppressed. Furthermore, in the present embodiment, such light blocking member has a function of sealing the periphery of the panel hole portion 13 between the liquid crystal panel 11 and the lighting device 320. Therefore, foreign substances are less likely to enter through the panel hole portion 13, and the event in which the display quality of the liquid crystal display device 310 is reduced can be suppressed.

As described above, in the present embodiment, the lighting device 320 further includes the double-sided adhesive tape 315 arranged to cover the hole edge of the light guide plate hole portion 33 in the light guide plate 30 from the light exiting surface 30a side and to block the light exiting from the hole edge. Therefore, a region where the brightness is locally high can be further suppressed from being formed at the periphery of the light guide plate hole portion 33.

Furthermore, in the present embodiment, the double-sided adhesive tape 315 has the first adhesive layer 315b whose surface on the light guide plate 30 side is black, and hence the brightness of the end face of the double-sided adhesive tape 315 can be suppressed from becoming locally high by the light guided by the first adhesive layer 315b.

Moreover, in the present embodiment, the double-sided adhesive tape 315 may laminate the lighting device 320 and the liquid crystal panel 11 in the liquid crystal display device 310. According to such configuration, an existing double-sided adhesive tape can be given the function of the light blocking member, and thus is suitable.

Fifth Embodiment

Figure 12:
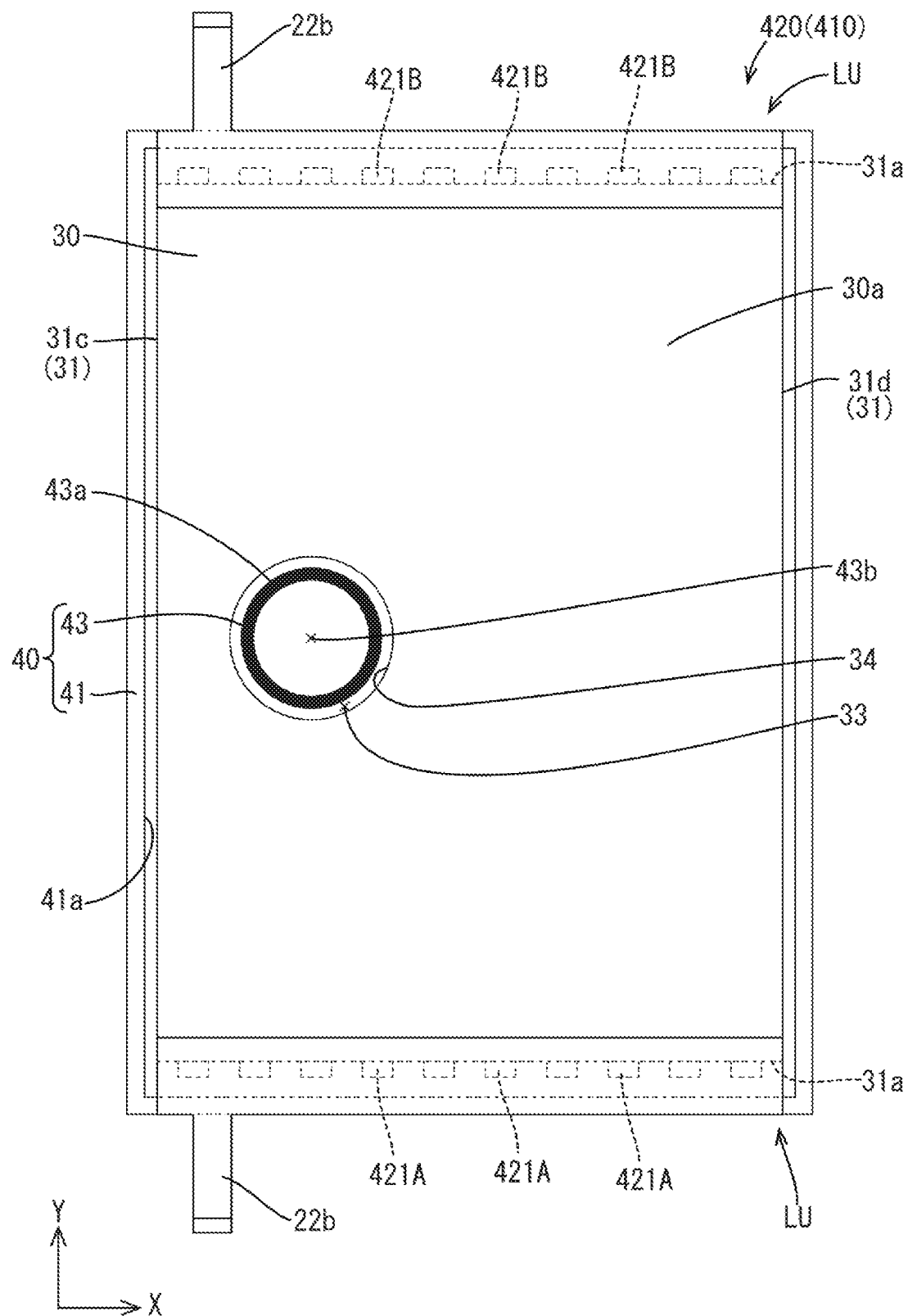
FIG. 12 is a plan view of a lighting device according to a fifth embodiment.

Next, a liquid crystal display device 410 (lighting device 420) according to a fifth embodiment will be described with reference to FIG. 12. The liquid crystal display device 410 of the present embodiment differs from the embodiments described above in that a pair of LEDs 421A, 421B are arranged at positions sandwiching the light guide plate hole portion 33 of the light guide plate 30. The same reference numerals are denoted on portions same as the embodiments described above, and redundant description will be omitted.

In the present embodiment, both end faces on the long side of the outer peripheral end face 31 of the light guide plate 30 are assumed as light entering surfaces 31a, 31a opposing the LED 21, and the pair of LED units LU, LU are arranged on the light entering surface 31a, 31a sides of the light guide plate 30, respectively. According to such configuration, of the pair of LEDs 421A, 421B, light from one LED 421B (LED 421A) can be supplied to a region on the opposite side of the light guide plate hole portion 33 with respect to the other LED 421A (LED 421B), and with the inner peripheral wall portion 43 as a shielding object, the brightness of the region on the opposite side of the LED 421A (LED 421B) with respect to the light guide plate hole portion 33 can be suppressed from being locally reduced. That is, in the present embodiment, the brightness distribution of the entire light exiting surface 30a can be made more uniform by the light of the LEDs 421A, 421B entering through opposing two directions.

Sixth Embodiment

Next, a liquid crystal display device 510 (lighting device 520) according to a sixth embodiment will be described with reference to FIG. 13. The liquid crystal display device 510 of the present embodiment differs from the fifth embodiment in that a light guide plate 530 has a substantially toric shape in a plan view. The same reference numerals are denoted on portions same as the fifth embodiment, and redundant description will be omitted.

Figure 13:
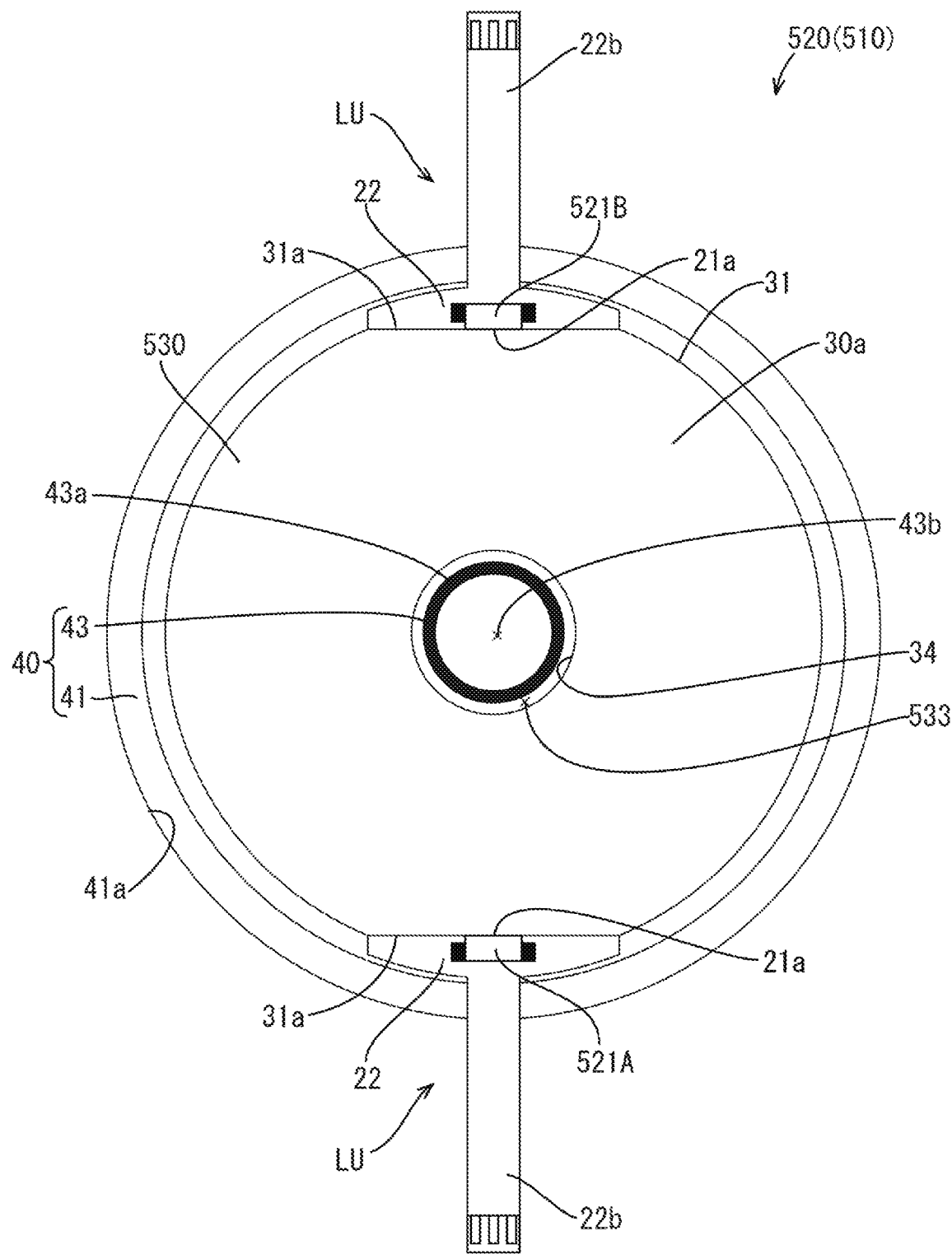
FIG. 13 is a plan view of a lighting device according to a sixth embodiment.

As shown in FIG. 13, the light guide plate 530 includes a pair of light entering surfaces 31a, 31a. Each light entering surface 31a, 31a is configured to a shape in which a peripheral end of the circular plate shaped member is cut out to an arc shape. The light entering surfaces 31a, 31a have LEDs 521A, 521B arranged to oppose each other in the vicinity of the center.

In the configuration in which the light guide plate 530 has a substantially toric shape, a configuration in which the LEDs 521A, 521B and the inner peripheral wall portion 43 are arranged opposing each other can be easily obtained, and in particular, a region on the LED 521A and the LED 521B side at the periphery of the light guide plate hole portion 533 easily becomes a region where the brightness is locally high. In the present embodiment, on the other hand, a configuration in which the opposing surface 43a of the inner peripheral wall portion 43 has a lower light reflectivity than that of the opposing surface 41a of the outer peripheral wall portion 41 is adopted. Therefore, the region where the brightness is locally high can be suitably suppressed from being formed.

Seventh Embodiment

Figure 14:
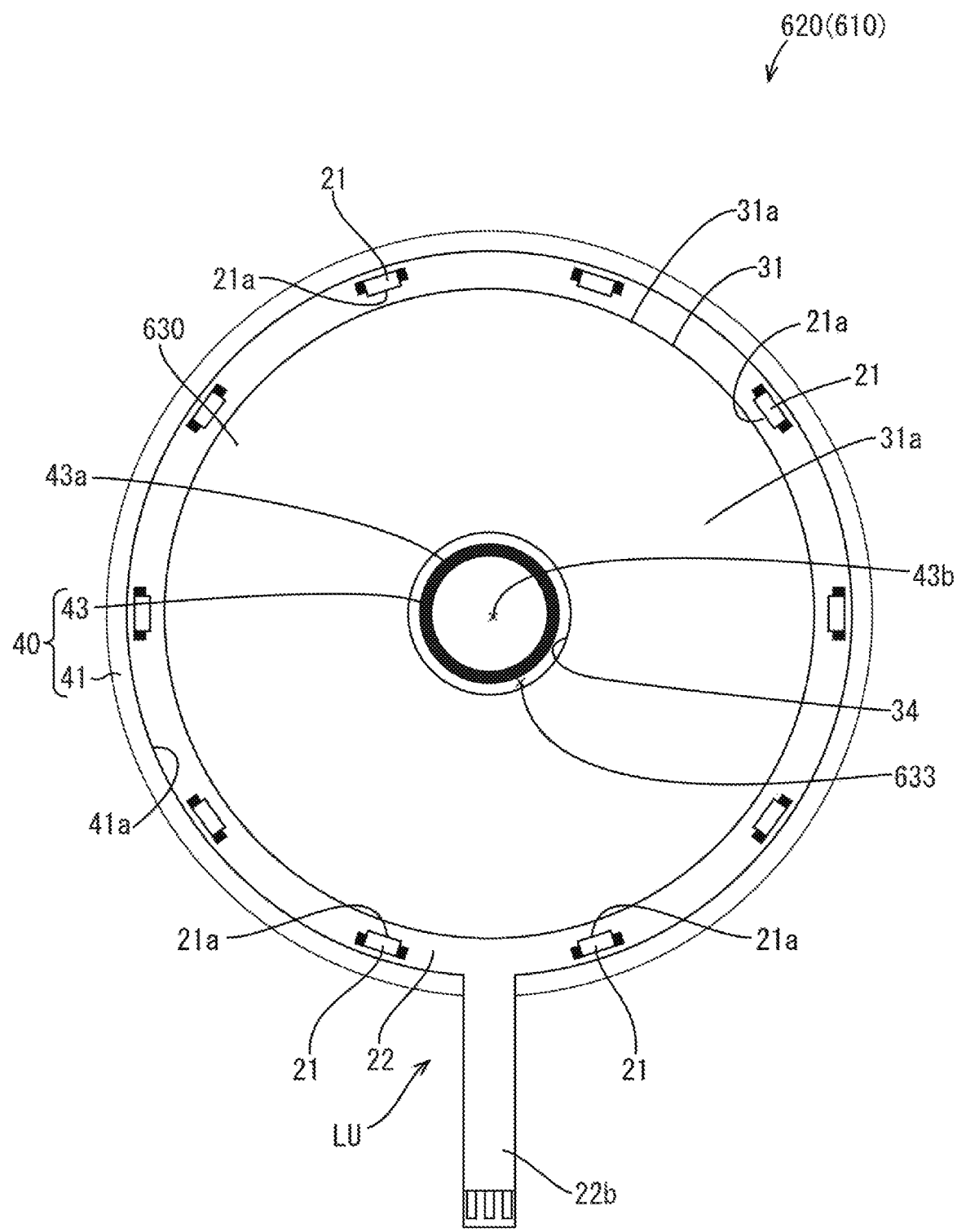
FIG. 14 is a plan view of a lighting device according to a seventh embodiment.

Next, a liquid crystal display device 610 (lighting device 620) according to a seventh embodiment will be described with reference to FIG. 14. The liquid crystal display device 610 of the present embodiment differs from the sixth embodiment in the arrangement configuration of the LED 21. The same reference numerals are denoted on portions same as the sixth embodiment, and redundant description will be omitted.

A plurality of LEDs 21 are arrayed in a toric shape while maintaining an interval with each other on the LED unit LU. Each LED 21 is configured such that the respective light emitting surface 21a faces the center position of a light guide plate 630, and the respective light emitting surface 21a emits light toward the center position.

In the configuration in which the plurality of LEDs 21 are arrayed in a toric shape, the light tends to easily concentrate at the center position of the light guide plate 630, and as the light is reflected by the inner peripheral wall portion 43, the hot spot tends to be easily generated at the periphery of the light guide plate hole portion 633. In the present embodiment, on the other hand, a configuration in which the opposing surface 43a of the inner peripheral wall portion 43 has a lower light reflectivity than that of the opposing surface 41a of the outer peripheral wall portion 41 is adopted. Therefore, the region where the brightness is locally high can be suitably suppressed from being formed.

In such configuration, there is a concern that the brightness of the region on the opposite side from the LED 21 with respect to the light guide plate hole portion 633 may be locally reduced with the inner peripheral wall portion 43 acting as the shielding object, but in the present embodiment, the brightness distribution of the entire light exiting surface 30a becomes more uniform as the light of the LED 21 enters from various directions intersecting each other.

Eighth Embodiment

Figure 15:
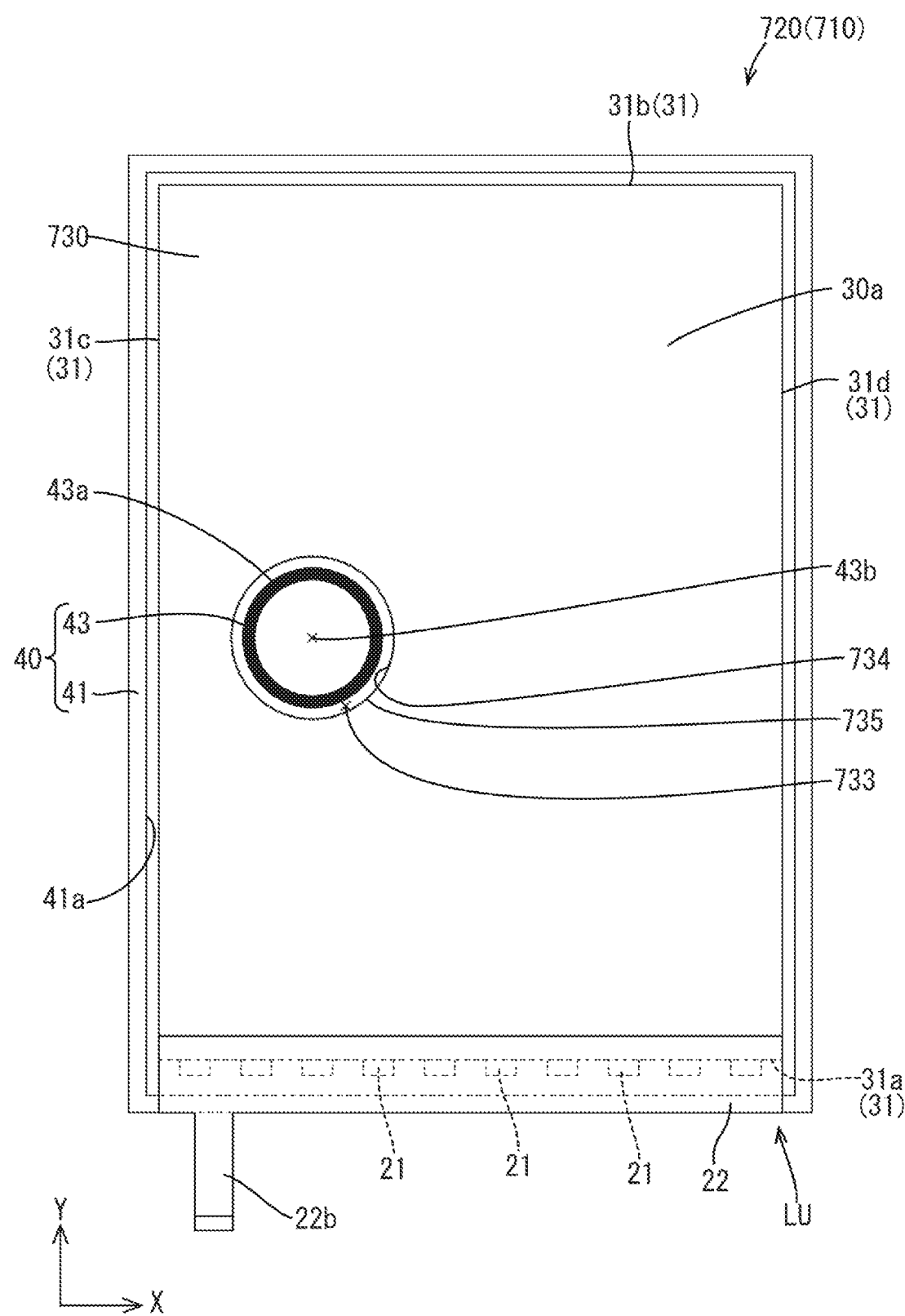
FIG. 15 is a plan view of a lighting device according to an eighth embodiment.
Figure 16:
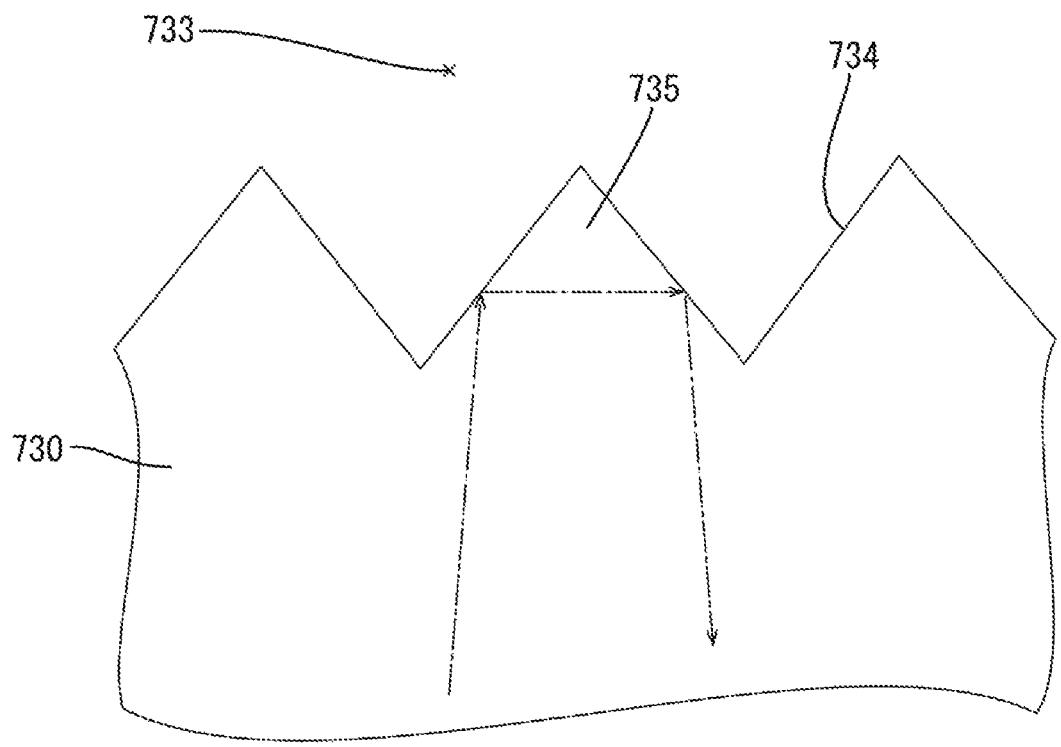
FIG. 16 is an explanatory view schematically showing a state of propagating light exiting from an LED at a periphery of a light guide plate hole portion.

Next, a liquid crystal display device 710 (lighting device 720) according to an eighth embodiment will be described with reference to FIGS. 15 and 16. The lighting device 20 of the present embodiment differs from the embodiments described above in the shape of an inner peripheral end face 734 of a light guide plate 730. The same reference numerals are denoted on portions same as the embodiments described above, and redundant description will be omitted.

The light guide plate 730 has a roulette shape 735 (one example of light reflecting portion) on the inner peripheral end face 734. The roulette shape 735 is a microscopic (e.g., pitch of 0.25 mm, height of 0.125 mm) prism pattern formed with protrusions extending along the thickness direction of the light guide plate 30.

The operation of the inner peripheral end face 734 of the light guide plate 730 in the present embodiment will be described. The light advancing from the inside of the light guide plate 730 toward the inner peripheral end face 734 is reflected in a mode of being totally reflected by the roulette shape 735, as shown with a dash line arrow in FIG. 16, and returned to the inside of the light guide plate 730. The reflection at the roulette shape 735 is a total reflection, as opposed to the scatter reflection of the inner peripheral wall portion 43P in the comparative example, and thus the reflected light is less likely to exit as a hot spot toward the light exiting surface 30a side of the light guide plate 730 at the periphery of a light guide plate hole portion 733. As a result, the amount of light leaking out from the inner peripheral end face 734 of the light guide plate 730 and the periphery thereof can be reduced, and the usage efficiency of the light from the LED 21 can be further enhanced.

In the present embodiment, the inner peripheral end face 734 of the light guide plate 730 includes a light reflecting portion configured to reflect the light advancing outward from the inside of the light guide plate 730 toward the interior of the light guide plate 730. Thus, the amount of light leaking out into the light guide plate hole portion 733 of the light guide plate 730 and being reflected at the inner peripheral wall portion 43 can be reduced, and the region where the brightness is locally high can be suitably suppressed from being formed at the periphery of the light guide plate hole portion 733.

Other Embodiment

The present invention is not limited to the embodiments described according to the above description and the figures, and for example, following embodiments are also encompassed within a technical scope of the present invention.

(1) In each embodiment described above, the inner peripheral wall portion is illustrated to be made from resin such as black polycarbonate, but the material of the inner peripheral wall portion is not limited thereto. For example, the inner peripheral wall portion may be made of metal such as aluminum and stainless steel. Furthermore, the inner peripheral wall portion made of metal is suitably matte black paint stainless steel, black alumite processed aluminum, and the like. Furthermore, the color of the inner peripheral wall portion is not limited to black, and merely needs to be a color having a lower light reflectivity than that of the outer peripheral wall portion.

(2) In each embodiment described above, one hole portion (portion corresponding to second non-display area of liquid crystal panel) is formed in the light guide plate, but in other embodiments, two or more hole portions may be formed in the light guide plate.

(3) Other than each embodiment described above, the shape, size, and position of the light guide plate (hole portion thereof) or/and frame can be appropriately changed. The outer peripheral wall portion of the frame merely needs to have a shape that surrounds at least one part (one side) of the outer peripheral end face of the light guide plate, and for example, may be configured to a shape that surrounds three end faces excluding the light entering surface of the outer peripheral end face.

(4) In the embodiment described above, a configuration in which the lighting device is accommodated in the casing has been illustrated, but this is not the sole case. For example, in the frame including the bottom surface portion as in the third embodiment, the back side casing may be eliminated and the frame and the front side casing may be assembled to each other such that the frame of the lighting device constitutes the outer appearance of the liquid crystal display device.

(5) In the fourth embodiment described above, double-sided adhesive tape in which the base member, the first adhesive layer and the second adhesive layer are black has been illustrated as the light blocking member, but the configuration of the light blocking member is not limited thereto. For example, the double-sided adhesive tape in which the base member is white and the first adhesive layer and the second adhesive layer are transparent may be adopted for the light blocking member. Furthermore, the light blocking member may be a one-sided adhesive tape including only the base member and the first adhesive layer, or a band-shaped member not including the adhesive layer.

(6) The number of LEDs arranged is not limited to that illustrated in the embodiment described above, and can be appropriately changed. Furthermore, in the embodiment described above, the LED is illustrated as the light source, but this is not the sole case.

(7) In each embodiment (excluding fifth to seventh embodiments) described above, an arrangement in which one end face on the long side of the outer peripheral end face of the light guide plate acts as the light entering surface opposing the LED has been shown, but an arrangement in which which the LED and the LED substrate are arranged such that one end face on the short side in the light guide plate acts as the light entering surface is also encompassed within the present invention. In addition, the LED and the LED substrate may be arranged such that both end faces on the short side in the light guide plate respectively act as the light entering surface. Furthermore, the LED and the LED substrate may be arranged such that arbitrary three end faces or all four end faces in the light guide plate act as the light entering surface.

(8) In the embodiment described above, the TFT is used as the switching element of the liquid crystal display device, but a switching element (e.g., thin film diode (TFD)) other than the TFT may be used.

(9) In the embodiment described above, the liquid crystal panel has been illustrated as the display panel, but the present invention can also be applied to other types of display panel (MEMS (Micro Electro Mechanical Systems) display panel, etc.).

(10) The display device of the embodiment described above configures one part of an instrumental panel of an automobile, but the present invention is not limited thereto, and for example, may be applied to various types of display devices such as smartphone and tablet terminal.

EXPLANATION OF SYMBOLS 10, 110, 210, 310, 410, 510, 610, 710: liquid crystal display device (display device)
11: liquid crystal panel (display panel)
12A: display area
12C: second non-display area (non-display area)
20, 120, 220, 320, 420, 520, 620, 720: lighting device
21, 421A, 421B, 521A, 521B: LED (light source)
30, 130, 530, 630, 730: light guide plate
30a: light exiting surface
31: outer peripheral end face
31a: light entering surface
33, 133, 533, 633, 733: light guide plate hole portion
34, 734: inner peripheral end face
40, 240: frame
41, 241: outer peripheral wall portion
41a: opposing surface
43, 243: inner peripheral wall portion
43a: opposing surface
315: double-sided adhesive tape (light blocking member, adhesive tape)
315b: first adhesive layer (adhesive layer)
735: roulette shape (light reflecting portion)

The invention claimed is:

1. A lighting device comprising:
a light source;
a light guide plate including a hole portion passing through in a thickness direction, a light entering surface which is an outer peripheral end face and to which light from the light source enters, and a light exiting surface which is a plate surface and through which light which has entered through the light entering surface exits; and
a frame surrounding the light guide plate, the frame including an outer peripheral wall portion opposing the outer peripheral end face of the light guide plate, and an inner peripheral wall portion in the hole portion and opposing an inner peripheral end face of the light guide plate on an inner side of the hole portion and in which a surface opposing the inner peripheral end face has a lower light reflectivity than that of a surface opposing the outer peripheral end face of the outer peripheral wall portion, wherein
the light guide plate has a substantially toric shape in a plan view, and
a plurality of light-emitting diodes are arrayed in a toric shape while maintaining a regular interval with each other.

2. The lighting device according to claim 1, wherein the inner peripheral wall portion includes a surface opposing the inner peripheral end face that is black.

3. The lighting device according to claim 2, wherein the outer peripheral wall portion includes a surface opposing the outer peripheral end face of the outer peripheral wall portion that is white.

4. The lighting device according to claim 1, further comprising a light blocking member arranged to cover a hole edge of the hole portion in the light guide plate from the light exiting surface side and provided to block light exiting through the hole edge of the hole portion.

5. The lighting device according to claim 4, wherein the light blocking member includes an adhesive layer in which a surface on the light guide plate side is black.

6. A display device comprising:
the lighting device according to claim 4; and
a display panel including a display area that is arranged on a light exiting side of the lighting device and that carries out display using light from the lighting device, and a non-display area that is arranged in the display area and corresponds to a position of the hole portion and where image is not displayed,
wherein the light blocking member is a double-sided adhesive tape laminating the lighting device and the display panel.

7. The lighting device according to claim 1, wherein the inner peripheral end face of the light guide plate includes a light reflecting portion that reflects light advancing outward from the inside of the light guide plate toward the interior of the light guide plate.

8. The lighting device according to claim 1, wherein the light source is a pair of light sources that are arranged at positions sandwiching the hole portion of the light guide plate.

9. A display device comprising:
the lighting device according to claim 1; and
a display panel including a display area that is arranged on a light exiting side of the lighting device and that carries out display using light from the lighting device, and a non-display area that is arranged in the display area and corresponds to a position of the hole portion and where image is not displayed.

10. A lighting device comprising:
a light source;
a light guide plate including a hole portion passing through in a thickness direction, a light entering surface which is an outer peripheral end face and to which light from the light source enters, and a light exiting surface which is a plate surface and through which light which has entered through the light entering surface exits; and
a frame surrounding the light guide plate, the frame including an outer peripheral wall portion opposing the outer peripheral end face of the light guide plate, and an inner peripheral wall portion in the hole portion and opposing an inner peripheral end face of the light guide plate on an inner side of the hole portion and in which a surface opposing the inner peripheral end face has a lower light reflectivity than that of a surface opposing the outer peripheral end face of the outer peripheral wall portion, wherein a shape of the inner peripheral end face of the light guide plate is a microscopic prism pattern protruding along the thickness direction of the light guide plate.

11. The lighting device according to claim 10, wherein the inner peripheral wall portion includes a surface opposing the inner peripheral end face that is black.

12. The lighting device according to claim 11, wherein the outer peripheral wall portion includes a surface opposing the outer peripheral end face of the outer peripheral wall portion that is white.

13. The lighting device according to claim 10, further comprising a light blocking member arranged to cover a hole edge of the hole portion in the light guide plate from the light exiting surface side and provided to block light exiting through the hole edge of the hole portion.

14. The lighting device according to claim 13, wherein the light blocking member includes an adhesive layer in which a surface on the light guide plate side is black.

15. A display device comprising:
the lighting device according to claim 13; and
a display panel including a display area that is arranged on a light exiting side of the lighting device and that carries out display using light from the lighting device, and a non-display area that is arranged in the display area and corresponds to a position of the hole portion and where image is not displayed,
wherein the light blocking member is a double-sided adhesive tape laminating the lighting device and the display panel.

16. The lighting device according to claim 10, wherein the light guide plate has a substantially toric shape in a plan view.

17. The lighting device according to claim 10, wherein the inner peripheral end face of the light guide plate includes a light reflecting portion that reflects light advancing outward from the inside of the light guide plate toward the interior of the light guide plate.

18. The lighting device according to claim 10, wherein the light source is a pair of light sources that are arranged at positions sandwiching the hole portion of the light guide plate.

19. A display device comprising:
the lighting device according to claim 10; and
a display panel including a display area that is arranged on a light exiting side of the lighting device and that carries out display using light from the lighting device, and a non-display area that is arranged in the display area and corresponds to a position of the hole portion and where image is not displayed.

* * * * *